United States Patent

Carr

[11] Patent Number: 6,118,823
[45] Date of Patent: Sep. 12, 2000

[54] CONTROL SCHEME FOR SHARED-USE DUAL-PORT PREDICTED ERROR ARRAY

[75] Inventor: Jeffery Dean Carr, Vestal, N.Y.

[73] Assignee: International Business Machines Corporation, Armonk, N.Y.

[21] Appl. No.: 08/831,157

[22] Filed: Apr. 1, 1997

[51] Int. Cl.[7] ................................................. H04N 7/12
[52] U.S. Cl. ........................................................ 375/240.28
[58] Field of Search .................................. 348/845.1, 384, 348/401, 467; 375/240.28; H04N 7/12

[56] References Cited

U.S. PATENT DOCUMENTS

| | | | |
|---|---|---|---|
| 4,736,239 | 4/1988 | Sprague et al. | 358/21 R |
| 4,740,832 | 4/1988 | Sprague et al. | 358/21 R |
| 5,253,041 | 10/1993 | Wine et al. | 358/11 |
| 5,379,351 | 1/1995 | Fandrianto et al. | 382/41 |
| 5,455,629 | 10/1995 | Sun et al. | 348/466 |
| 5,488,432 | 1/1996 | Guillon et al. | 348/717 |
| 5,526,054 | 6/1996 | Greenfield et al. | 348/467 |
| 5,644,504 | 7/1997 | Boice et al. | 348/401 |
| 5,748,240 | 5/1998 | Carr et al. | 348/384 |
| 5,880,786 | 3/1999 | Oku et al. | 348/715 |

*Primary Examiner*—Young Lee
*Attorney, Agent, or Firm*—Heslin & Rothenberg, P.C.; William H. Steinberg, Esq.

[57] ABSTRACT

An MPEG-2 compliant digital video encoder system having a refinement processor for reconstructive processing for I-picture and P-picture encoding. The refinement processor includes a frame difference unit which has a predicted error array (PE array). The predicted error array comprises a shared-use array for storing both luminance data and chrominance data of a macroblock of data. The predicted error array also comprises a dual-port structure and array read control logic which allows simultaneous reading and writing of data to the array. Address selector logic controls addressing of the PE array such that writing of luminance data and chrominance data to the PE array and reading of luminance data and chrominance data from the array remains synchronous.

21 Claims, 14 Drawing Sheets

CONTROL SCHEME FOR SHARED-USE DUAL-PORT PREDICTED ERROR ARRAY

TECHNICAL FIELD

This invention relates in general to an apparatus for encoding digital visual images including spatial (intra-picture) and temporal (inter-picture) compression, that is reducing both redundancy within a picture and redundancy between pictures. Redundancy within pictures is reduced, or even eliminated, by the use of the discrete cosine transform, quantization, and variable length encoding. Redundancy between pictures is reduced, or even eliminated, through the use of motion vectors. One aspect of temporal compression, that is, compression between pictures, is calculating the difference between a current macroblock and a reference macroblock. This difference is calculated in a frame difference unit. The frame difference unit receives macroblock data in various formats and, by blocking bits in an address counter, stores the macroblock data in a memory in a common format. This invention is specifically directed to an enhanced, shared-use dual-port predicted error array and associated control scheme for use within the frame difference unit.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as motion estimation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity is left to the encoder developers.

One aspect of the MPEG-2 compliant encoding process is calculating the difference between the current and reference macroblocks. This is accomplished in a frame difference unit (FD). Because of specific macroblock encoding algorithms, data to be processed through the frame difference unit arrives in various word lengths and must be formatted such that when used it has the same format as other data. The frame difference unit calculates the difference, that is the difference in luminance and chrominance, between the current macroblock and the best match reference macroblock. Data, that is reference macroblock chrominance and luminance data and current macroblock chrominance and luminance data, to be processed through the frame difference unit arrives in various word lengths and must be formatted such that when used it has the same format as other source data that is used. These various word lengths and formatting requirements impose difficulties in designing storage arrays within the frame difference unit. One preferred approach for formatting macroblock data as well as providing addressing for storage arrays within the frame difference unit is described in commonly assigned, copending U.S. patent application Ser. No. 08/616,328, entitled "OPTIMAL ARRAY ADDRESSING CONTROL STRUCTURE", which is incorporated herein in its entirety.

There remains a need in the art for an enhanced addressing control scheme for a frame difference unit which is capable of writing and reading luminance and chrominance data, at the same time, to and from the predicted array, while maintaining the order of the data written the same as the output order of the data to be sent. Further, the present invention addresses the problem of controlling shared access to the shared-use predicted error array of the frame difference unit.

DESCRIPTION OF THE INVENTION

Briefly described, the invention comprises in a first aspect a digital video encoder system which includes a refinement processor for reconstructive processing for I-picture and P-picture encoding. The refinement processor includes a frame difference unit which has a predicted error array (PE array). The PE array comprises a shared-use array for storing both luminance data and chrominance data of a macroblock of data. The encoder system further includes address selector logic for addressing the PE array to provide synchronous writing and reading of both luminance data and chrominance data to and from the PE array.

In another aspect, the invention comprises a digital video encoder system which includes a refinement processor for reconstructive processing for I-picture and P-picture encoding. The refinement processor has a frame difference unit with a dual-port predicted error array (PE array). The PE array comprises a shared-use array storing both luminance data and chrominance data of a macroblock of data. The system further comprises array read control logic for controlling reading of data from the dual-port PE array simultaneous with writing of data to the PE array without overrunning the writing of data to the PE array.

In still another aspect, the invention comprises a method for controlling storing of a macroblock of data in a predicted error array (PE array) of a frame difference unit within a refinement processor of a digital video encoder system. The macroblock of data includes both luminance data and chrominance data. The method comprises: writing the luminance data and the chrominance data of the macroblock of data into the PE array; reading data from the PE array simultaneously with writing of data to the PE array without overrunning the writing of data into the PE array; and maintaining the writing and reading of luminance data and chrominance data to and from the PE array in synchronous order.

To restate, presented herein is a shared-use predicted-error array (PE array) for a frame difference unit of a digital video encoder system. The PE array is designed to receive both luminance data and chrominance data of a macroblock of data. The dual-use predicted error array further comprises a dual-port structure and associated control logic for allowing simultaneous writing and reading of data to and from the array. In addition, sequencing of data both into and out of the array is preserved and performance is enhanced by monitoring the writing of data into the array and by beginning reading of data from the array as soon as possible without permitting overrunning of further writing of data to the array.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
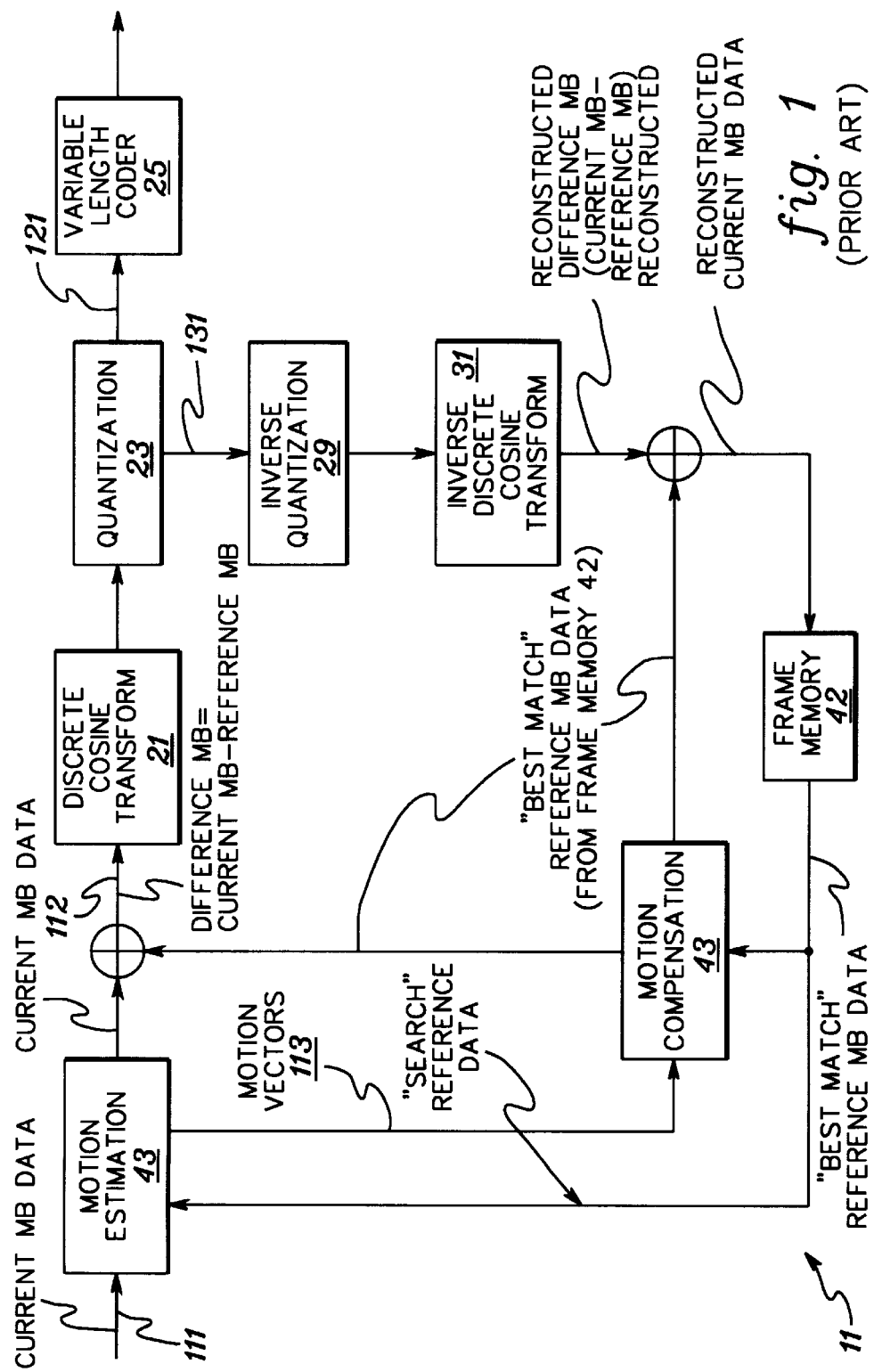
FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113, the picture output 121, the feedback picture for motion estimation and compensation 131, and the motion compensated picture 101. This figure has the assumptions that the $i^{th}$ pictures exists in Frame Memory or Frame Store 42, and that the $i+1^{th}$ picture is being encoded with motion estimation.

The invention relates to scalable MPEG and HDTV compliant encoders and encoding processes. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are the temporal compression functions. Spatial and temporal compression are repetitive functions with high computational requirements.

More particularly the invention relates to a processor for performing spatial and temporal compression including discrete cosine transformation, quantization, entropy encoding, motion estimation, motion compensation, and prediction, and even more particularly to a system for accomplishing spatial and temporal compression.

The scalable processor system has an I-frame only video encoder module with a Discrete Cosine Transform processor, a quantization unit, a variable length encoder, a FIFO buffer, and a compressed store interface. The system also includes a second processor element, that is, an R-processor or Reconstruction processor with a reference memory interface, motion estimation and compensation capability, inverse quantization, and inverse discrete cosine transformation, and motion compensation means; and at least one third processor element motion estimation. The system can be in the form of a single integrated circuit chip, or a plurality of integrated circuit chips, that is one for each processor, the I-frame video encoder module, the second processor element, and the third processor element. There can be one or more of the third processor units.

The first compression step is the elimination of spatial redundancy, for example, the elimination of spatial redundancy in a still picture of an "I" frame picture. Spatial redundancy is the redundancy within a picture. Because of the block based nature of the motion compensation process, described below, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag pattern, and converted into run-amplitude (run-level) pairs. Each pair indicates the number of zero coefficients and the amplitude of the non-zero coefficient. This is coded in a Variable Length Code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111X of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
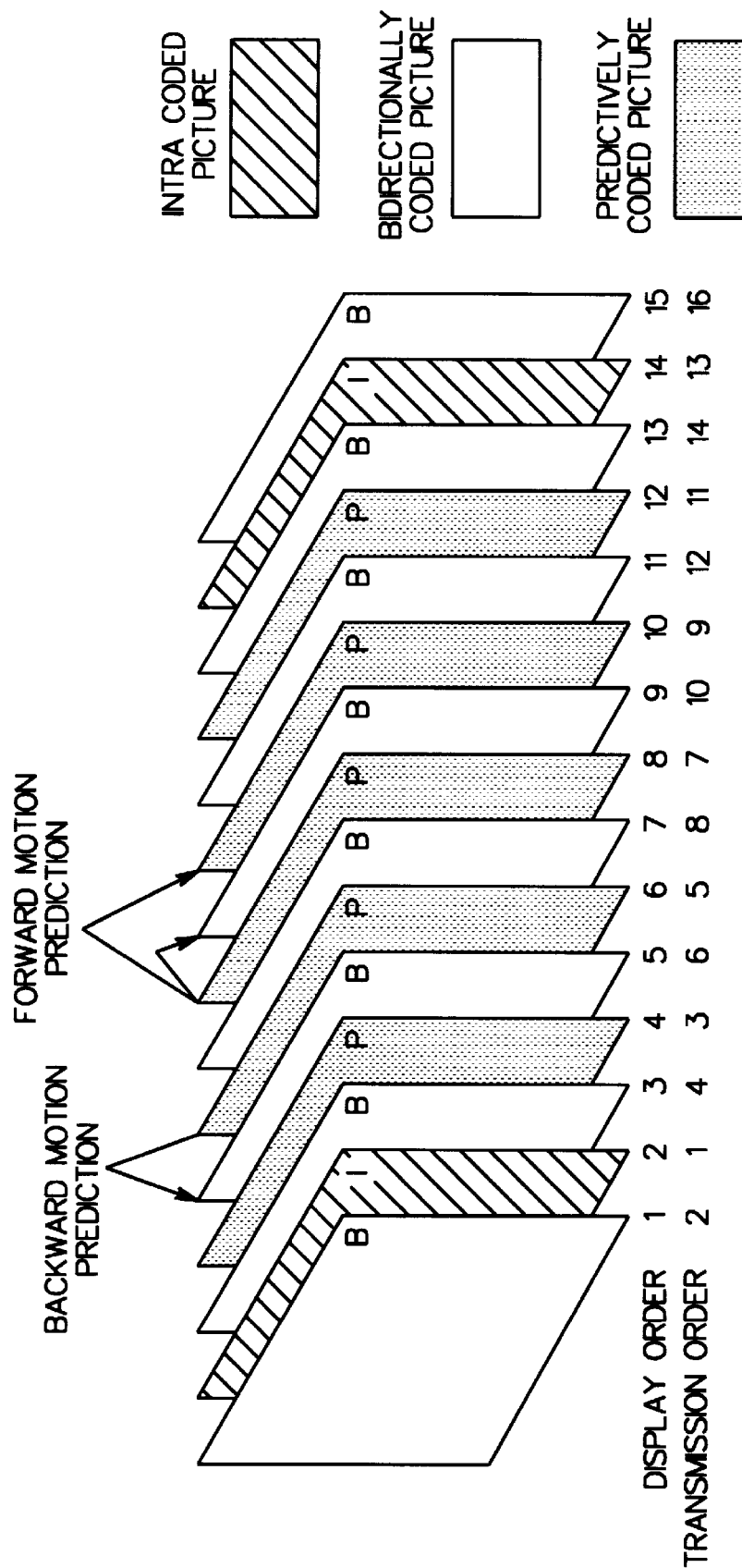
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
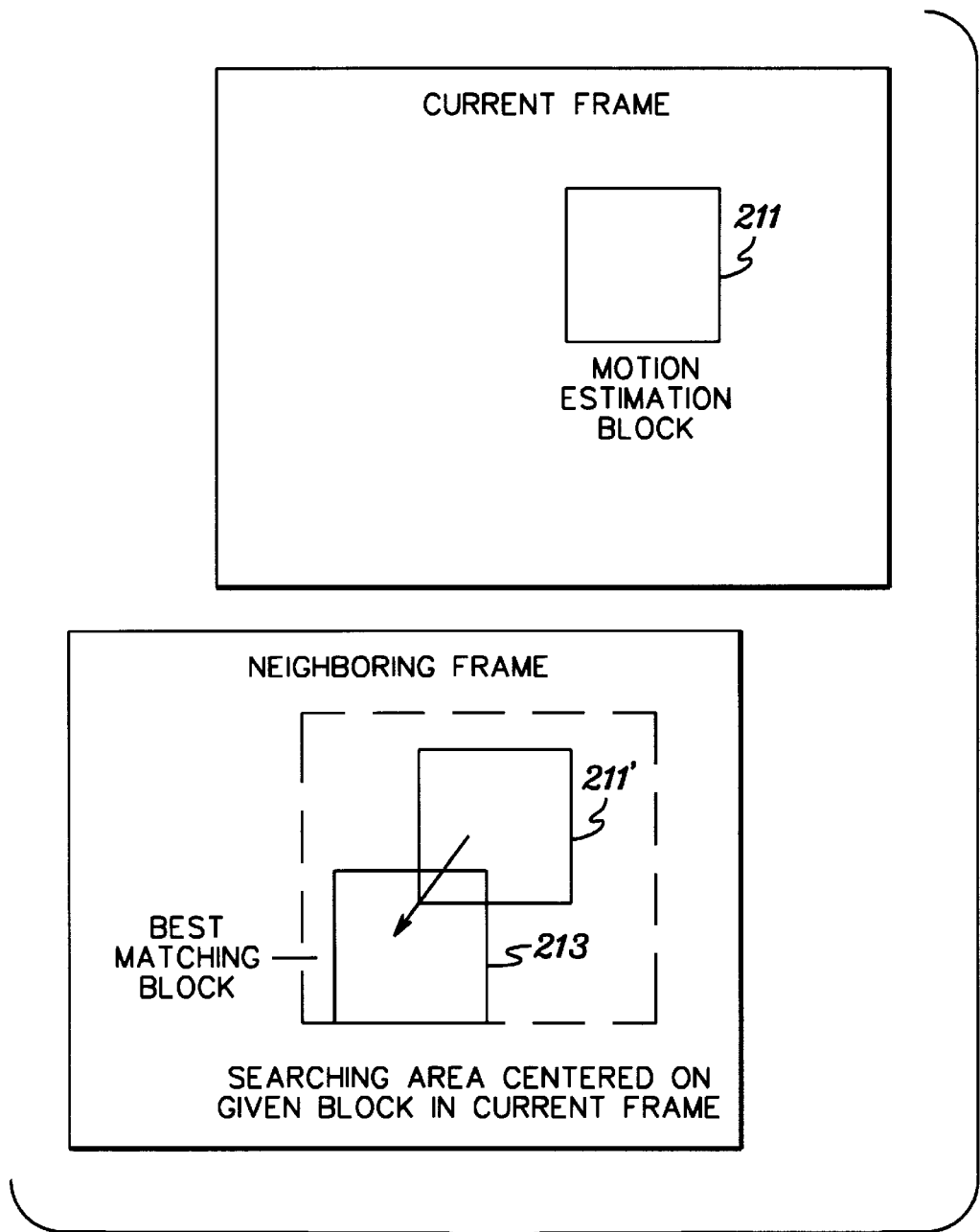
FIG. 3 illustrates the search from the motion estimation block in the current frame or picture to the best matching block in subsequent or previous frame or picture. Elements 211 and 211' represent the same location in both pictures.
Figure 4:
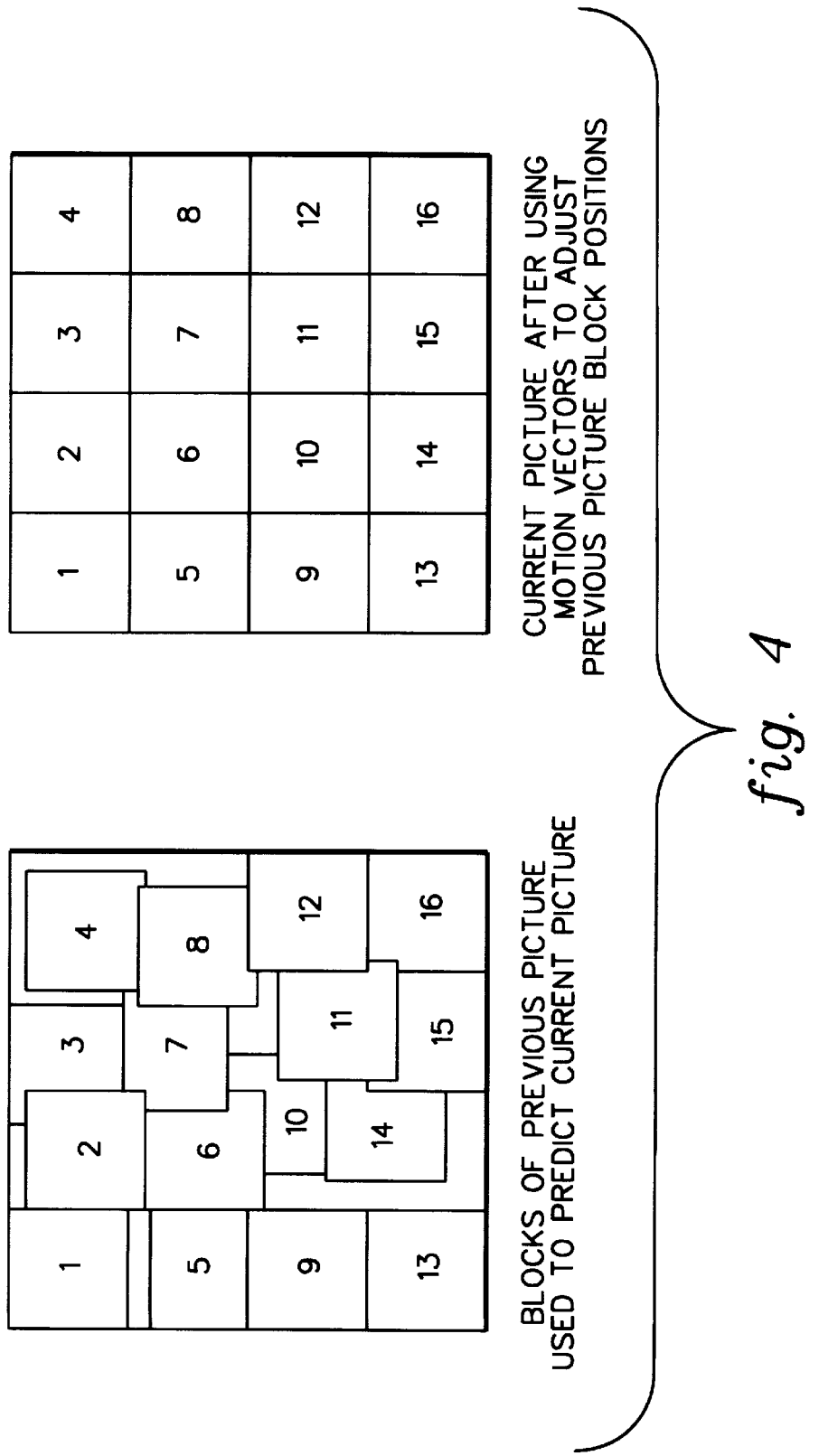
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG2 encoder are implemented in three basic devices: an I or Intra device, an R or Reconstruction or Reference device, and an S or Search device. The functions are partitioned according to application needs, silicon size, tools and design complexity, and performance.

Figure 5:
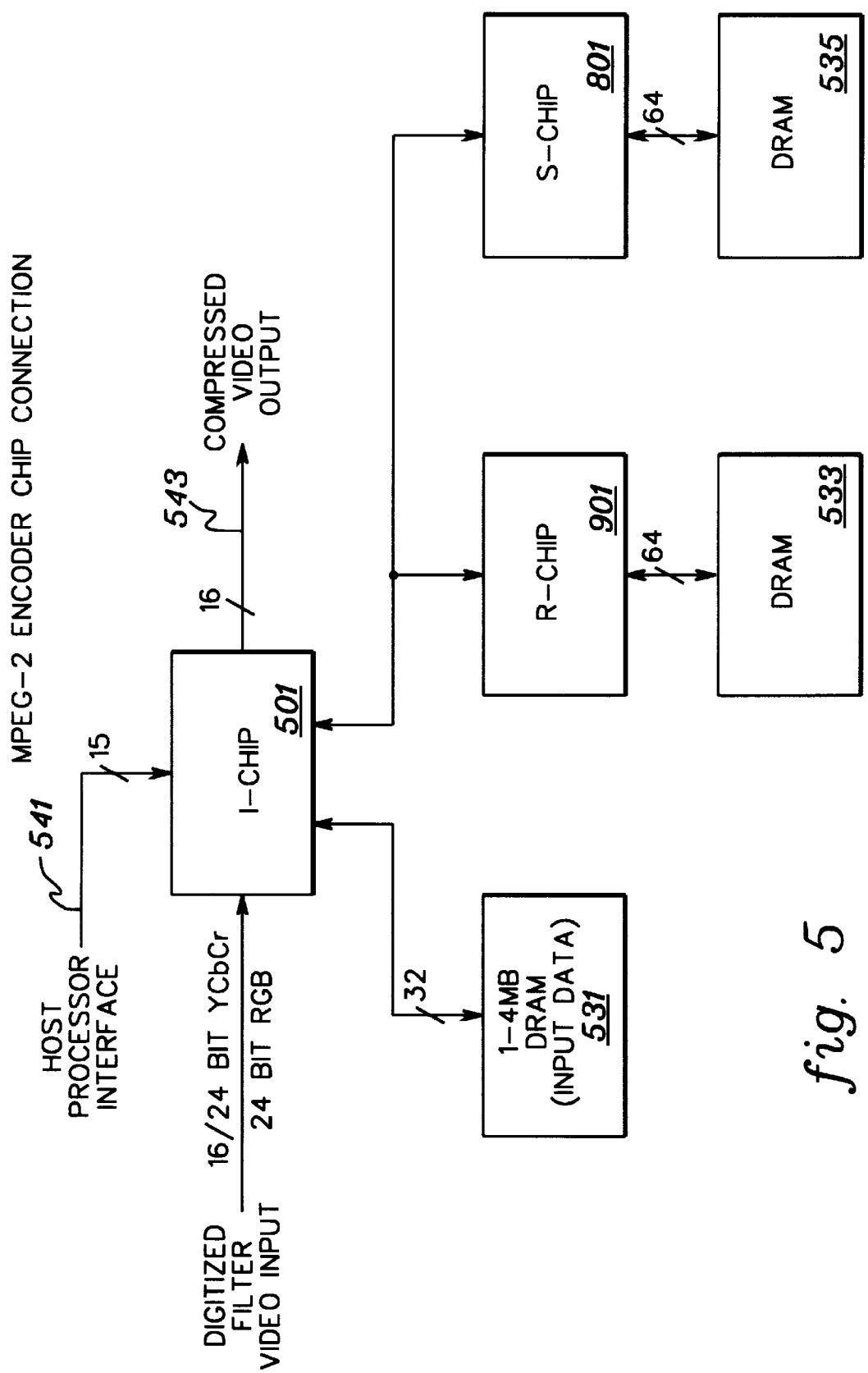
FIG. 5 shows the combination of three encoder chips of the invention. These are the Intra-chip or Intra-processor 601, the Reference-chip or Reference-processor 801, also referred to equivalently herein as a Reconstruction-chip or Reconstruction-processor 801, the Search-chip or Search-processor 901, and associated RAM chips 531, 533, and 535, including DRAM chips and SRAM chips. The Intra-chip or Intra-processor contains the host processor interface, it receives digitized filtered video input 541, and it produces a compressed video output 543.
Figure 6:
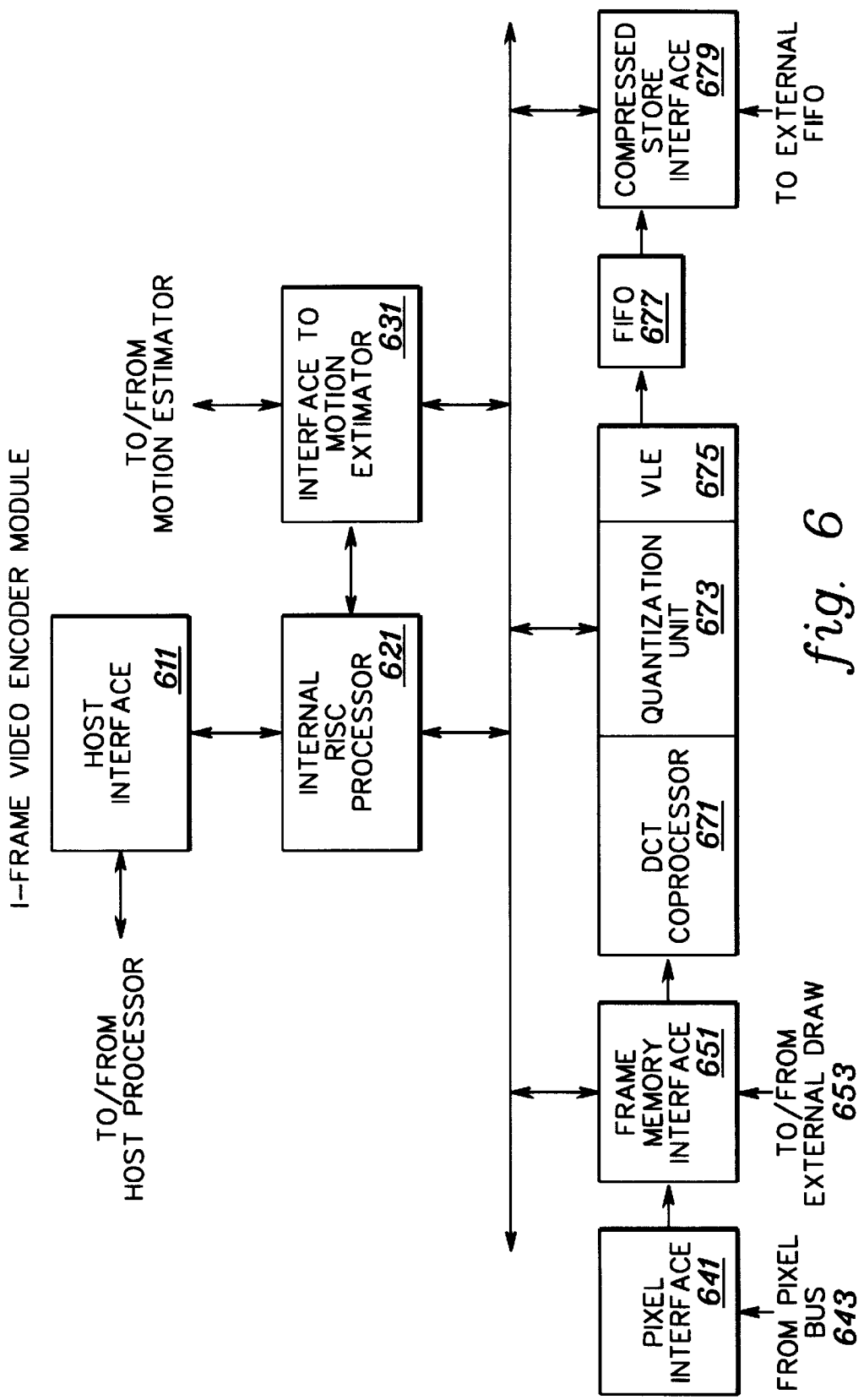
FIG. 6 shows an I-frame video encoder module 601 with a host interface 611, an internal RISC processor 621, an interface to motion estimation means 631, a pixel interface 641 for receiving pixel data from a pixel bus 643, a frame memory interface 651 receiving frame data from and sending frame data to an external RAM 653, a Discrete Cosine Transform (DCT) processor 671, a quantization unit 673, a variable length encoder 675, a FIFO buffer 677, and a compressed store interface 679.

As shown in FIG. 6 all external communications including pixel interface 641, host interface 611, and output data interface 679 are done in a single I device 601. The I device 601 is the master interface of the encoder, and is a basic requirement in any video compression application using the chip set of the invention, as shown in FIG. 5. A programmable processor 621 along with the entropy coding functions, that is the Discrete Cosine Transform processor unit 671, the quantization unit 673, and the variable length encoder unit 675, are incorporated in this chip. As a result, this device could be used in an application requiring encoding of I-only pictures. A reconstructed interface is also added to allow functional expansions. The processing functions applied prior to encoding are also included in this device.

Figure 9:
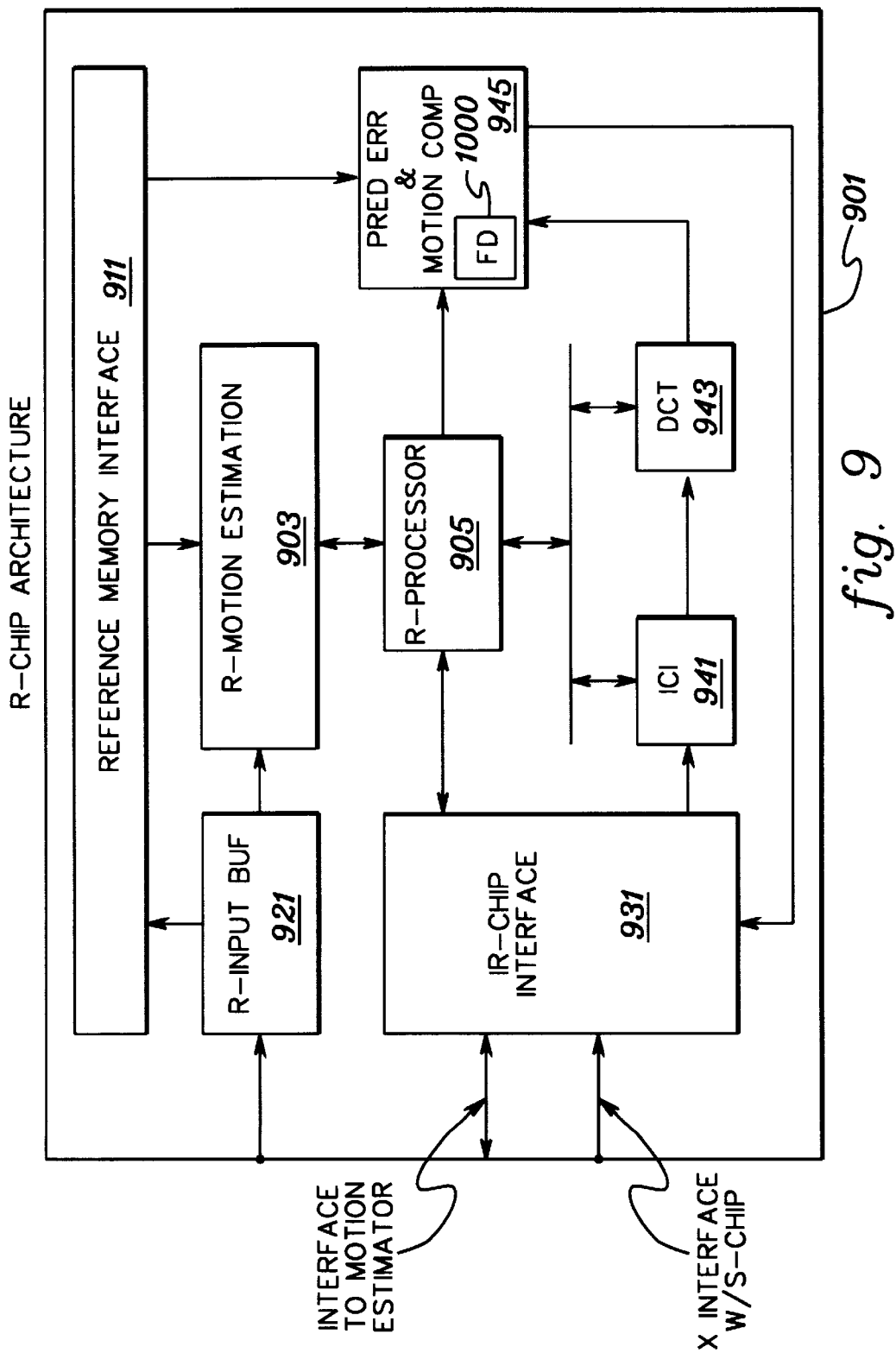
FIG. 9 shows a Reference-chip or processor 901 with a reference memory interface 911, a Reference-input buffer 921, Reference-motion estimation 903, an IR chip or processor interface 931, a Reference-chip or processor element 901', inverse quantization (IQ) 941, an inverse discrete cosine transform unit (IDCT) 943, and error prediction and motion compensation 945.

Reconstructive processing of the macroblock is needed for all non I-picture coding, that is P picture and B picture encoding. Functions such as Inverse Discrete Cosine Transformation 943 (IDCT), Inverse Quantization 941 (IQ), and Motion Compensation 903 (MC) are consolidated in a single chip, the R chip or R processor, 901, as shown in FIG. 9. The R chip or R processor is also referred to as the Reconstruction chip. A small motion estimation function capability with a programmable processor is also added to handle low motion applications. A search result interface is installed for higher motion applications. As a result, the I and R-chips together could be used in applications with less motion such as distance learning, video conferencing, surveillance, etc.

Motion estimation is a repetitive function and has high computational requirements. A hardware device, the Search-chip or processor 801 shown in FIG. 8 with external programmable registers is dedicated to this function. An expansion interface is installed to attain a larger search range. The three chip configuration can be used for applications like broadcast transmission, and the like. For higher motion, such as high speed photographic scientific applications, additional S chips 801 provide higher picture quality with a larger search range. This is a scalable feature of the architecture.

Chip Partition

The connections of the three encoder chips are shown in FIG. 5. FIG. 5 shows the combination of three encoder chips of processor elements. These are the Intra-chip or Intra-processor 601, the Reference-chip or Reference-processor 801, the Search-chip or Search-processor 901, and associated RAM chips 531, 533, and 535, including DRAM chips and SRAM chips. The Intra-chip or Intra-processor is the host processor interface, it receives digitized filtered video input 541, and it produces a compressed video output 543.

I-chip

The I-chip 601, shown in FIG. 6 handles the input data 541 and output bitstream 543 of the encoder system. Incoming pixel data is stored in frame format in an external DRAM, referred to as a frame store. This chip performs the core functions necessary for I frame encoding. Pixel data is converted from the RGB format to the YCbCr format, if needed. Pixel data is monitored for scene changes and for repeat fields created by 3:2 pulldown. Incoming pixel data is also adjusted to create HHR output format. The encoder can receive field or frame input format and output field or frame encoded data, regardless of how it was input. Input 4:2:2 data can be encoded as 4:2:2 or 4:2:0 output. The on-chip RISC processor 621 is responsible for adaptive DCT, adaptive quantization, and rate control. The processor has a dynamically partitionable structure that allows it to operate as a 4 byte engine or four 1 byte engines. This is described in commonly assigned, copending U.S. application Ser. No. 08/411,239 filed Mar. 27, 1995 by Charles Boice, John M. Kaczmarczyk, Agnes Ngai, and Robert C. Woodard for DYNAMICALLY PARTITIONABLE DIGITAL VIDEO PROCESSOR, the entirety of which is incorporated herein by reference.

The encoded macroblock is merged with header information as described in commonly assigned U.S. Pat. No. 5,526,054 by James D. Greenfield, Diane M. Mauersberg, and Agnes Ngai, for APPARATUS FOR HEADER GENERATION, the entirety of which is hereby incorporated herein by reference. This creates the final MPEG-2 or MPEG-1 output bitstream which the encoder can store to an external DRAM or ship to a FIFO, for example, through compressed store interface 679. When the picture is stored to DRAM it can be read out by the user through the host interface in non-real time. R-chip or Processor The R chip or processor 901, also referred to as the Refinement chip or the Reconstruction chip, shown in FIG. 9 is responsible for search motion estimation refinement and reconstruction of pictures for motion compensation. External DRAM is used to support the motion estimation function. The R chip or processor functional unit performs all the base functions required for reconstruction of pictures and motion estimation, including calculating and processing for the frame differences.

The primary functions of the processor are macroblock type decisions, adjusting search range per picture, and motion estimation assists. Both quantizer data and Search chip search results are received through a common chip interface. Quantized data is then dequantized using up to four matrix tables. The IDCT converts the coefficients to pixel data via a two dimensional inverse transform. This reconstructed picture data is saved as reference data by the memory interface for subsequent picture coding. The motion estimation can support field, frame dual prime, bidirectional motion types to half pel resolution along with I, P and B pictures.

The two chip configuration (Intra- & Refinement/Reconstruction-chips) can support up to +/−8H and +/−7V search range and the 3 chip configuration (Intra-, Refinement/Reconstruction, & Search chips) can support up to +/−64H and +/−56V. As motion estimation results are needed, the search window size and best match results are determined, and frame difference data is generated.

Search-chip or Processor

Figure 8:
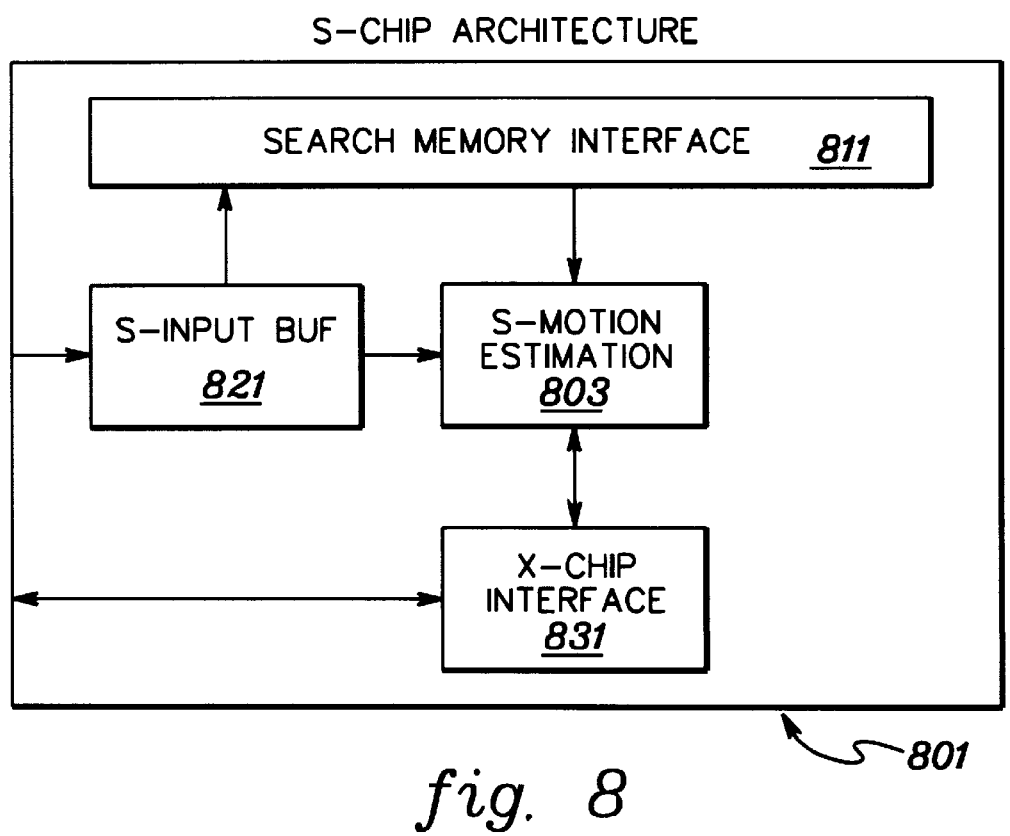
FIG. 8 shows an S chip or processor 801, with a search memory interface, a Search-input buffer 821, Search-motion estimation 803, and an X-chip interface 831.

The Search-chip or processor 801, shown in FIG. 8, is responsible for the bulk of the motion estimation. The purpose of motion estimation is to find the location of a macroblock from the current picture (current picture macroblock or "CMB") in the reference picture. This location is determined by finding the best match, which is determined by comparing the CMB data to the reference pictures data and factoring in a bias which is based on the motion of previous pictures.

The entire reference picture cannot be searched in real time. Therefore, a subset of the reference picture is searched. This subset is called the Search Window. See FIG. 3. The larger the search window, the higher the chance of finding an exact match for the CMB. The search window can be significantly increased by employing additional Search-chips 801. Effective motion estimation produces higher quality video and highly compressed bit streams. The Search-processor receives the search window parameters from the processor on the Refinement/Reconstruction-processor and receives luminance picture data in either frame or field format from the Intra-chip, based on the picture structure.

The reference pictures are stored in off-chip SRAM in frame format. The motion estimation unit performs field searches on the CMB and the reference picture. Four field results are calculated along with a frame result for frame structured pictures. The results are in the form of difference data and are biased based on previous pictures motion characteristics. The biased difference data along with motion vectors are sent to the R-chip or processor 901, e.g., for calculation of the frame difference in the Frame Difference Unit.

Processing flow

The I-chip or processor 601 contains both the pre-processing and entropy coding functions. The pre-processing functions are performed prior to any coding functions. The entropy coding is the last portion of picture processing. Its block diagram is shown in FIG. 6.

Host interface

A host interface 611 is installed on the Intra-chip 601, and serves as the main control channel between the encoder chip set and its external world. This interface is a generic 16 bit data and 8 bit address RAM-type protocol. Registers defined at this interface include commands, configuration parameters, encoding parameters, initialization data, mailbox, etc. Host commands include start encode, stop encode, retrieve compressed picture from output DRAM, etc. Configuration parameters include memory size, memory type, number of chips installed in the encoder system, etc.

Encoding parameters can be set at power on or can be modified at a picture boundary to guide the encoding process. These parameters include video input format versus video output format, users matrix tables, intra VLC table, ZZ scan pattern, field/frame picture coding, number of pictures in a sequence, number of pictures in a GOP, number of B pictures, number of reference fields, and user specific data, among others. This interface is also used to initialize the chip set. There are two internal processors in the encoder chip set. Both processors' instructions are downloaded through this interface. In addition there are buffers that require specific contents in order to function properly are also initialized via this interface.

Mailbox is a communication mechanism between the on-chip processor and external processor. When a command or new information is sent to the on-chip processor via the mailbox register, with the correct level of processor code, the new command is implemented. These registers provide flexibility. The defined functions could be selected or de-selected during the coding process by host writes. A stack is also installed at this interface to allow register changes during coding process. The stack is twelve deep. Host writes will only be written into the stack if the encoder is busy in a picture encoding. Information written into the stack will be processed at the end of current picture processing. The encoder appears busy to the external processor until the stack is empty. This design reduces the communication time between picture processings and allows maximum coding time.

Pixel interface

The pixel interface is a 24 bit pixel interface that is used to receive RGB digital input. It can also handle 16 or 24 bit YCbCr input data. A color conversion circuitry, scene change detection logic, and 3/2 pulldown inversion functions are also installed at this interface.

The color conversion, a form of data reduction, is ready to convert the input data to 4:2:2 or 4:2:0 chrominance encoding format.

Every location in a picture is represented by luminance and chrominance pixel data. As specified in the MPEG2 standard, YCbCr data is the input data format for compression and output of decompression. For RGB input data, the input must first be converted into 4:2:2 format prior to any encoding process. If the input data is in 4:2:2 YCbCr format, this means every location in a picture is represented by 8 bits of luminance data and 8 bits of alternative color Cb and Cr data. If the input is in 4:2:0 YCbCr format, this means every location in a picture is presented by 8 bits of luminance data and horizontally and vertically subsampled color Cb and Cr data. The unnecessary and redundant information is removed by the color conversion process and/or 4:2:2 to 4:2:0 decimation at the input stage to achieve one step of compression and to minimize the amount of data flowing through the remaining encoder. This reduces the performance requirement in the remaining devices.

To cover a wide range of applications, MPEG2 standard documents many coding tools and options for the compression process. However, the trade-offs between quality/performance versus complexity for a given application is left for the encoder developers. Many of the coding options are adaptive within a picture, either at the picture level or at the macroblock level. This flexibility allows increased bitrate controls. Dynamic and adaptive changes of coding options could be applied to future coding based on the present information or it could also be applied to present data based on future information. Scene change detection, a look-ahead mechanism that collects picture information prior to the encoding process, provides much more efficient control. Scene change detection indicates large variances between pictures and also complexity differences. The scene change detection calculation is performed on the input data; there are no extra data flows or bandwidth requirements on the remaining functions. Since the input picture order is different from the encoding order, up to three pictures of information are pre-processed, through the scene change detection logic. The scene change detection logic can be used to regulate the quality of the picture being processed. This level of look ahead allows the encoder to dynamically change coding options at both the beginning and the middle of picture processing.

If a 3/2 pulldown inversion is enabled, the input data contains redundant or repeat fields. To be more efficient, the redundant data must be removed prior to encoding. Repeat field detection requires at least one field data be saved. The on-chip storage space requirement for repeat field detection makes it more economical to save the field data in external memory. The input data is first saved in frame store DRAM and has to be retrieved for repeat field detection and picture encoding. The detection scheme is based on a 3/2 pattern. With effective 3/2 PDI logic, for every thirty input pictures, only twenty-four pictures would be encoded after the 3/2 pulldown inversion is applied. The remaining memory bandwidth could then be used for repeat field data fetch. To minimize memory traffic, the following scheme is used: if the input data is odd field first, then the detection is performed on odd field data first, and even field data detection will be performed after a repeat odd field is detected. If the input data is even field first, then the reverse takes place. As a byte of data is received at the pixel interface, the same byte location in the previous field of the same parity is retrieved from frame store memory. A repeat field is determined at the end of field picture input. If the field is a repeat field, then its memory location will be used for input of the next field of the same parity. This eliminates memory fetch complexity during picture encoding.

Frame memory interface

Figure 7:
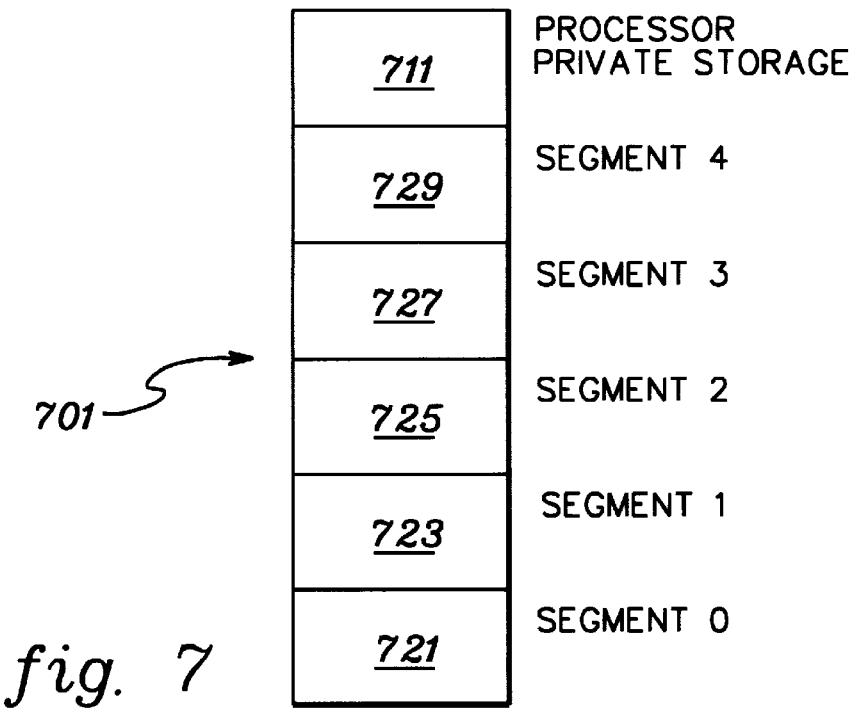
FIG. 7 shows a frame memory map 701, with processor private storage 711 and five memory segments 721, 723, 725, 727, and 729.

The frame memory interface is shown in FIG. 7.

At the output of the pixel interface, the input data is ready to be stored into an external DRAM attached to the Intra-chip, frame memory. This frame memory is only used to save the input picture (current data) until it is ready for encoding. Traffic at this interface is roughly two times the input data transmission rate. A 32bit data bus is used to support the DRAM, e.g., a 70 ns DRAM. For I and IP coding format, the input picture order is the same as the picture encoding order. For this reason, encoding starts when one macroblock of data is available. In this configuration, the frame memory is divided into six segments, five for input picture data and one for on-chip processor use. A segment of frame memory is selected for each input picture. Data in the picture is stored sequentially as offset of the beginning address as specified by the chosen segment. Each segment is one-quarter of a picture size. Four consecutive segments are used for each input picture. The five segments are used in rotation. The memory partition is shown in FIG. 7.

When the first input picture is recieved, it is stored into segment 4. Since each segment size is only one-quarter of a picture, the first picture uses segment 4, 3, 2, and 1. The second input picture is stored in segment 0, 4, 3, and 2. The third picture is stored in segment 1, 0, 4, and 3. The fourth picture is stored in segment 2, 1, 0, and 4. The fifth picture uses segment 3, 2, 1, and 0. Then the segment usage repeats again. This scheme allows a minimal memory requirement, 1 MB DRAM, for I and IP configurations. For IPB coding format, the input picture order is different from the encoding order, as shown in FIG. 2. Thus, an input picture must be saved entirely until it is ready to be used. In this case, the memory size is 2 MB for NTSC, and 4 MB for PAL. The frame memory is divided into five segments, four for input picture and one for on-chip processor use. Each segment is equal to the picture size. It is used in similar fashion to the non-IPB format. This scheme allows scalable memory requirements based on the coding formats.

The main traffic of the frame memory is comprised of input data store, 3/2 pulldown inversion data fetch, and encode data fetch. A priority scheme is employed at the frame memory interface with input data store having the highest priority and pulldown inversion data fetch the lowest priority. Input data store is issued when 32 B or more data is accumulated in the pixel interface. Data is stored continuously into DRAM, 4 bytes at a time, until there is less than 32 B data in the pixel interface, and a pending memory data fetch will then be serviced. The encode data fetch is a 16 by 16 byte macroblock. This fetch is dynamically interruptive at any DRAM row address by an input data store request. The interruptive fetch prevents data overrun at the pixel interface.

Macroblock data is pre-fetched to prevent coding pipeline stall. When the macroblock data is available, the coding process begins. The macroblock data flow depends on the picture type being processed. A predictive picture processing is assumed for the purpose of this description. For a P picture, the current macroblock data is delivered to all three devices simultaneously. The data usage in each chip is different, and the time when the data is used, is also different. The logical flow of this macroblock data, when it is received by all receiving devices, is from the S-chip or processor 801 to the R-chip or processor 901, and then back to the I-chip or processor 501.

Processing in the Search-chip or processor

Search-input buffer

In the Search-chip 801, shown in FIG. 8 the current macroblock data is primarily used in motion estimation. Depending on the search format selected by the user, the macroblock data is either downsampled 4 to 1, 2 to 1, or remain as 1 to 1 in the input buffer. A single Search-chip 801 provides the largest search range in the 4 to 1 format, and the least in the 1 to 1 format. The downsampled data in both the 4 to 1 and 2 to 1 format are carried out horizontally. This scheme eliminates the complexity of frame and field motion search with the same downsampled data. The downsampled data is saved in search memory, the external memory attached to the Search-chip, where it is to be used as reference data on the subsequent picture coding process. Input data is used in the motion estimation, and provides a more precise difference between the two picture data. At the same time, the data of the previously encoded reference picture in search memory is fetched for motion estimation. The amount of reference data to be fetched for each macroblock processing depends on the macroblock location and the search range.

S-motion estimation

To conserve chip real estate (silicon area), the on-chip reference data buffers in the motion estimation unit can contain 20 out of the 128 lines in the search window at a time. The reference data is fetched as the search process continues. The reference data buffers are comprised of two equal sized units. One of these units is used for odd line data and the other one is for even line data. The two buffers are separate entities. Thus, odd data search and even data search processes can take place simultaneously.

The biggest challenge in motion estimation is the computational power requirement. To minimize search circuitry, field searches are performed together, and the field search results are combined to form frame searches. For example, let Cf1 be the odd lines of current macroblock data, Cf2 be the even lines of current macroblock data, Rf1 be the odd lines of reference data, and Rf2 be the even lines of reference data.

Four field searches, Cf1 versus Rf1, Cf1 versus Rf2, Cf2 versus Rf1, and Cf2 versus Rf2 are performed concurrently. The results of Cf1 versus Rf1 and Cf2 versus Rf2, and Cf2 versus Rf1 and Cf1 versus Rf2 are combined to form the frame search results. The scheme eliminates the frame search circuitry.

Search-chip or Processor Result

The five full pixel refinement results are generated for each frame structured macroblock, one best match for the current odd field and one best match for the current even field.

Xchip interface

The xchip interface 831 supports communications between the Search-chip or processor 901 and Refinement-chip or Reconstruction-chip or processor 801 as well as among the Search-chips 901 in the configuration. For every macroblock, up to five search results, one frame and four fields, are passed to the R-chip 801 via this interface. This interface is also used for Search-chip 901 to Search-chip 901 communications. For multi-chip configuration, each Search-chip 901 has a chip ID. A pre-defined wiring pattern at each set of Search-chip 901 pins is used as the chip ID or address. Address 0 identifies the Search-chip 901 that has the main communication with the R-chip 801. The encoder structure can support one, two or four Search-chips 901. Address 3 identifies the last Search-chip 901 in the chain. In a four Search-chip or processor 901 configuration, the search window is divided into four quarters. Address 0 handles the upper left quarter, address 1 handles the upper right quarter, address 2 handles the lower left quarter and address 3 handles the lower right quarter. Search-chip 3 forwards the search result to Search-chip 2 when it is available. Similarly, for Search-chip 2 to 1 and Search-chip 1 to 0. The best match result obtained from the higher address Search-chip is compared with the result obtained in the receiving chip. The best of the two is then forwarded to the next Search-chip. The best match from all Search-chips is finally selected and returned to the R-chip.

Processing in R-chip or Processor

R-input buffer

The current macroblock data that was previously received from the Intra-chip 601 and is buffered on this chip, is used in the refinement process.

In IPB mode, the R-chip 801 processing lags the Search-chip 901. To ensure the pipeline is constantly full, the buffer is large enough for two macroblocks of data. The next current macroblock data is fetch when there is space in both the Search-input and R-input buffers.

R-motion estimation

The reference data has previously been saved in the external memory, i.e., reconstructed memory, connected to the R-chip 801, i.e., the Refinement- or Reconstruction-chip. The reference data, as the name implies, is composed of reconstructed data. When this data is used in motion refinement, it produces a prediction difference that matches the one reconstructed by the decoder. This scheme minimizes the difference between compression and decompression processes.

The R-chip or processor 801 also receives the search format selected by the user. Depending on the search format, the search results received from the Search-chip or processor 901 are upscaled accordingly back to the full picture resolution. A search refinement is performed based on the search result, including result from the 1 to 1 format. A maximum refinement search range of +/−4H and +/−1V is used.

Another big challenge of motion estimation is memory bandwidth. The reference data retrieved from reconstructed memory, once per macroblock, is buffered on-chip until the frame difference data is generated. This scheme minimizes external memory traffic. Each search result is first refined on a full pixel boundary. At most three full pixel results continue to the next refinement process, half pixel refinement. Up to eight half pixel macroblocks around each full pixel refinement result can be identified for further half pixel refinement search. All the full and half pixel refinement results are transferred to the on-chip processor, that is, the R-processor.

IR-chip interface

Depending on the search type, the R-processor 801 determines the macroblock type and the motion vector for every macroblock processed. Selectable search types may include frame only, field only, full pixel only, half pixel only, and adaptive field/frame motion. If adaptive frame/field motion estimation is selected, the best matched macroblock is used to continue the coding process. Based on the best matched decision, the matching chrominance data is retrieved from reconstructed memory. Both the luminance and chrominance frame difference data are generated and buffered in the Intra-chip 601 and R-chip 801 interface. The luminance difference data is transferred to the Intra-chip 601 first. When the quantized luminance data is returned to the R-chip 801, the chrominance difference data is then transferred to the Intra-chip 601. Both the difference data and the quantized data share the same bi-directional data bus between the Intra-chip 601 and R-chip 801. The data transfers are staged to avoid bus collision.

The quantized data is first passed through the inverse quantizer 941, then the inverse DCT unit 943, and then finally the motion compensation unit 945. The IDCT data is added to the current macroblock data, the one used in the macroblock search, as motion adjust in the Motion Compensation (MC) unit 945. The MC unit 945 produces the reconstructed data. It is buffered and ready to be stored into the reconstructed memory and be used as refinement reference data for subsequent picture coding.

In IP coding format the search refinement circuits on the R-chip 801 are used as a small motion estimator. The center of the search window is the location of the current macroblock. The R chip 801 can support up to +/−8H and +/−7V search ranges in the IP mode. Similarly to the IPB coding format, the reference data is fetched once per macroblock. This data is buffered on-chip until the frame difference data is created. A motion estimation on full pel is first performed. A refinement search is then performed on the best matched full pel macroblock data. Two refinements are carried out, dual prime and half pel search.

A best matched full pel macroblock data is split into odd and even field data. For each field data, the opposite parity data, with +/−1 delta, is retrieved from external memory by extending the origin field data address as specified in the standard. The field data is interpolated with its associated opposite parity data to form the reference data to be used in dual prime motion estimation.

Half pel refinement is performed by a process similar to the process used in IPB coding. All results including full pel, dual prime, and half pel searches are collected by the R-processor. The remaining processes are similar to the IPB mode.

Reference memory interface

For every macroblock process, there is a reference data fetch, a dual prime data fetch, a best matched chrominance data fetch, a reconstructed luminance data store, and a reconstructed chrominace data store. To reduce the memory bandwidth requirement, the reference data is only fetched once per macroblock. To ensure the pipeline is consistently full, the memory operations are handled in a specific order per the macroblock location in the picture. Since motion estimation is performed on just the luminance data, to improve the memory read rate for a specific operation, the luminance and chrominance data are stored in different regions in reconstructed memory.

Frame Difference Unit

A further aspect of the Reconstruction-chip or processor 801 is the Frame Difference Unit (FD). The Frame Difference Unit calculates the difference, that is the difference in luminance and the difference in chrominance, between the current macroblock and the best match reference macroblock. Data, that is reference macroblock chrominance and luminance data and current macroblock chrominance and luminance data, to be processed through the Frame Difference Unit arrives in various word lengths and must be formatted such that when used it has the same format as other source data that is used. Data may be stored to and retrieved from memory in two different orders, depending on controls within the Frame Difference Unit. The data also needs to be reformatted prior to sending it to the next unit in the Encoder. These various word lengths and formatting requirements impose difficulties in designing addressing and control for storage arrays within the Frame Difference Unit. The present invention is directed to writing and reading luminance and chrominance data at the same time to and from the storage array, while maintaining the order of data written the same as the output order of the data to be sent. Presented herein is an address control technique for sharing access to the array on the input and output sides of the array. In addition, in order to avoid bottlenecks to overall encoder performance, the problem of optimizing the amount of data needed to be written before reading begins is addressed.

Figure 10:
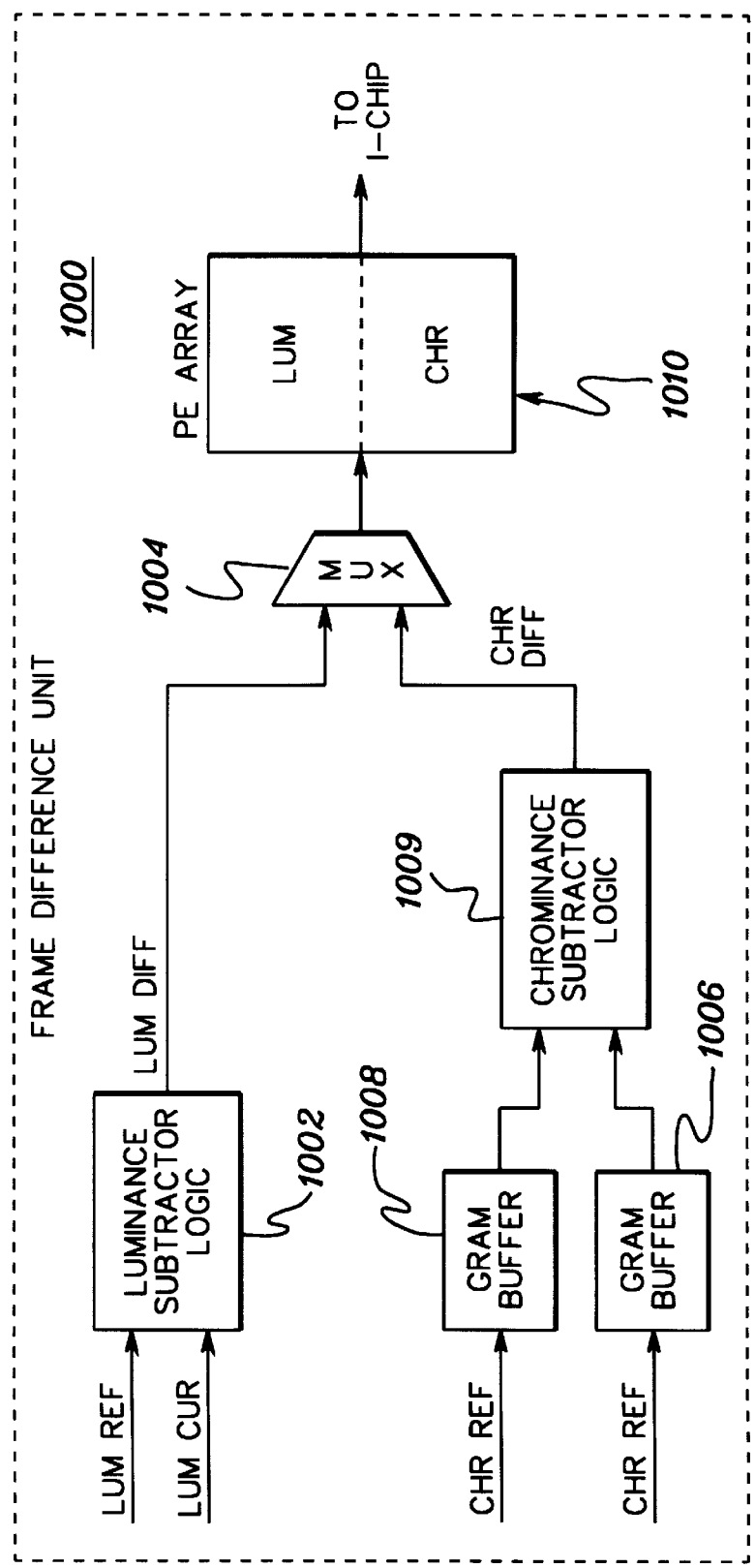
FIG. 10 depicts one embodiment of a Frame Difference Unit 1000 showing the organization of the luminance and chrominance words to be concatenated and stored in the predicted error array.

As shown in FIG. 10, the inputs to the Frame Difference Unit 1000 are the current macroblock and reference macroblock luminance and chrominance data (i.e., Lum Cur, Chr Cur, Lum Ref and Chr Ref).

The luminance data comes from the dual prime unit on the R- or reconstruction-chip or processor 801, with the current macroblock luminance data and the reference macroblock luminance data coming from the dual prime unit on the chip. The two luminance data are subtracted in Luminance Subtractor Logic 1002 to obtain the difference or predicted error for the luminance (i.e., Lum Diff). The difference is multiplexed 1004 into a Predicted Error Storage Array 1010 for ultimate transmission to the intra-processor or chip at the appropriate time.

The current macroblock chrominance data (Chr Cur) is received from the I-chip or intra-processor 601 and is stored in an array (GRAM buffer 1006) for later processing. The reference macroblock chrominance data (Chr Ref) is received from memory associated with the reconstruction-chip or reconstruction-processor 801 and stored in another array (GRAM buffer 1008) for later processing.

The current macroblock chrominance data and the reference macroblock chrominance data are subtracted at chrominance subtractor logic 1009 and the difference thereof (Chr diff) is then stored in another segment of the same PE Array that the luminance reference data was stored in. The chrominance difference data will also be sent out to the intra-chip or intra-processor 801 at a proper time after transmission of the luminance difference data.

Figure 11:
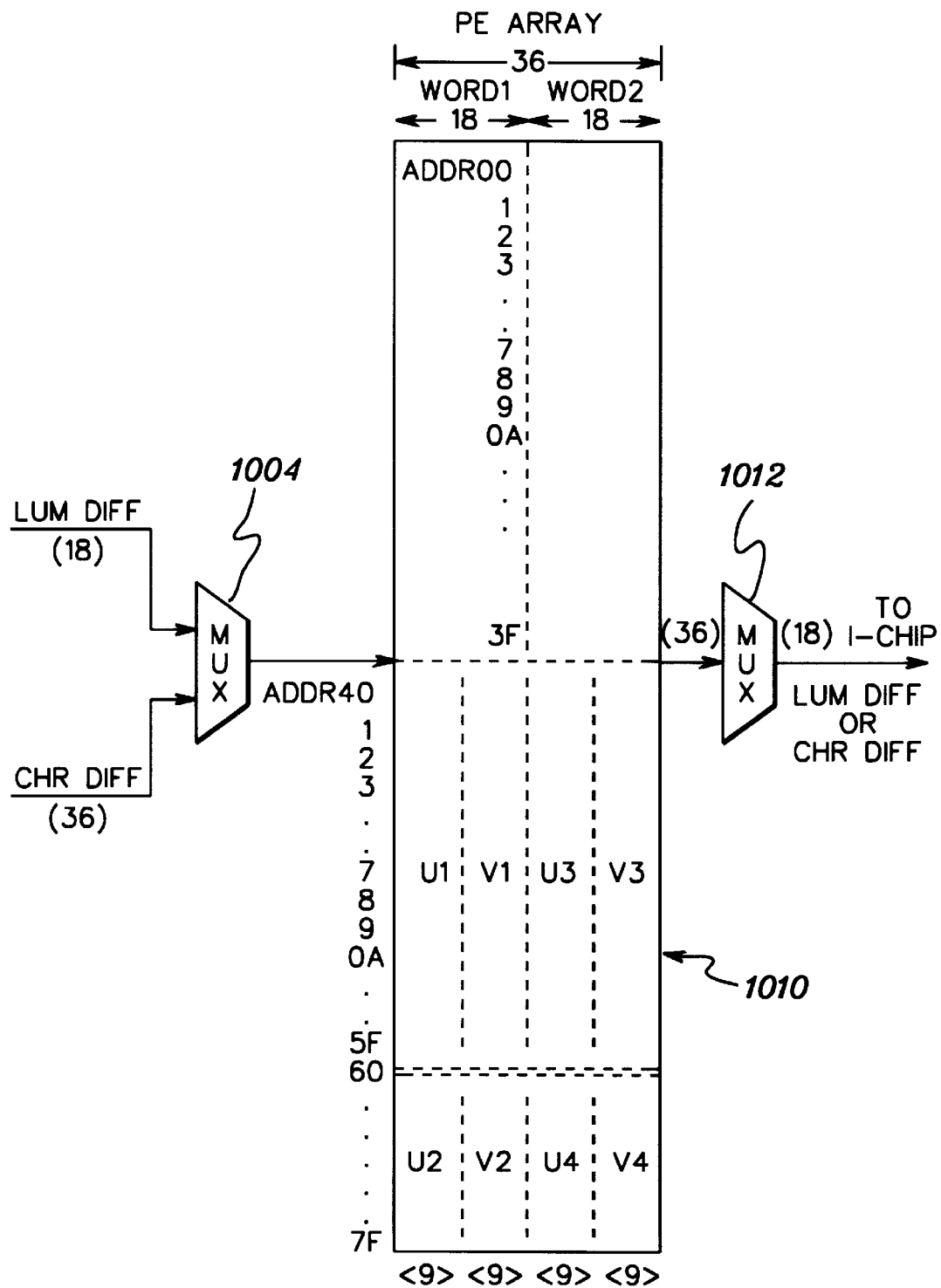
FIG. 11 depicts one embodiment of a predicted error array 1010 in accordance with the present invention showing both luminance data and chrominance data.

One embodiment of a PE Array 1010 in accordance with the present invention is depicted in FIG. 11. An addressing scheme for this array is described in detail in commonly assigned U.S. patent application Ser. No. 08/616,328 entitled "OPTIMAL ARRAY ADDRESSING CONTROL STRUCTURE," which as noted above is incorporated herein in its entirety. As shown in FIG. 11, the luminance difference (Lum Diff) result is 18 bits wide and is to be written to the PE GRAM or array 1010 which is 36 bits wide. Depending on a control line, this data is to be written to sequential addresses within the GRAM or to every other four addresses (that is, four addresses, skip four addresses, four addresses, skip four addresses, etc.) until the buffer is full. As used herein, "every other four" means the addressing scheme described hereinabove. The data is to be written as WORD1 concatenated with WORD2 across each line as addressed in the PE GRAM or array 1010.

The luminance predicted error (that is, the output of the PE array for luminance) is sent via an output multiplexer 1012 to the intra-chip or intra-processor 601 18 bits at a time, alternating between the WORD1 half of the GRAM and the WORD2 half of the GRAM until all of the luminance words are sent. This is illustrated in FIG. 11.

The current chrominance reference data from memory is received in 32 bit words and is to be written 32 bits at a time to the reference array. For a chroma format of 4:2:0 the array will be only half filled. Writes to this array are always addressed sequentially, and the reads can either be sequential or addressed every other four lines. Data is to be read out 32 bits at a time. For a 4:2:0 chroma format, the array needs to be only half read.

The chrominance data from the intra-chip or intra-processor 601 is received a byte at a time and written a byte at a time to the current array. The data bytes are to be written as four bytes across each line of the array. For a chroma format of 4:2:0, this array will only be half filled. Writes to this array are always addressed sequentially, and reads can either be sequential or addressed every other four lines. Data is to be read out 32 bits at a time. For a 4:2:0 chroma format, the data needs to be only half read.

The chrominance difference result is 36 bits wide and is to be written to the result GRAM (PE array 1010) which is 36 bits wide, as shown in FIG. 11. Depending on a control line, this data is to be written to sequential addresses within the PE array or to every other four addresses until the chrominance portion of the buffer is full. The data is to be written as one 36 bit word across each line as addresses in the PE GRAM or array 1010.

The chrominance predicted error, that is, the output of the result GRAM for chrominance, is to be sent to the Intra-chip or Intra-processor 18 bits at a time, using selectable combinations of U1, U2, U3, U4, V1, V2, V3, or V4, for the amount of data that was stored for either of the chroma formats 4:2:0 or 4:2:2.

For sequential addressing, for nn bits where one full line is to be written for each write, a k bit counter needs to be implemented, where $$nn=2^k.$$

For example, where the reference array needed to have 64 entries, a six bit counter would be used, with bits 0,1,2,3,4,5.

The counter address will then map directly to the sequential address, that is sequential_addr(0 to 5)=counter(0 to 5).

To design the addressing structure that provides the addresses that sequence through 4 addresses, then skips 4, then 4 addresses, and so on, the counter used in the sequential case can be used and the bits remapped, so that every_other_4_addr=counter(1 to 3,0,4,5).

Now, to design a sequential addressing structure where there will be p accesses per line for each line of the array, in an array of nn lines $$nn \times p=2^k.$$

For example, where the current data array needed to have 64 lines, with 4 accesses per line, an 8 bit counter is needed to address 256 entries, that is, bits 0 to 7.

The most significant 6 bits of the counter address is then used to produce an address that accesses each line four times in a row. That is sequential_addr(0 to 5)=counter(0 to 5)

where bits 6 and 7 are not used.

To design the addressing for the luminance section of the predicted error array, where there are 64 lines of two words each, or 128 entries, a 7 bit counter is used. To achieve 2 writes per line, all but the last bit of the counter address is used, that is, 2_write_addr(0 to 5)–counter(0 to 5)

where bit 6 is not used.

For the sequential case, the 2_write_addr is used as:

lum_seq_addr(0 to 5)=2_write addr (0 to 5)

For the every other 4 case the 2_write_addr bits are remapped to yield the lum_eo4_addr is lum_eo4_addr(0 to 5)=2_write_addr(1 to 3,0,4,5).

Figure 12:
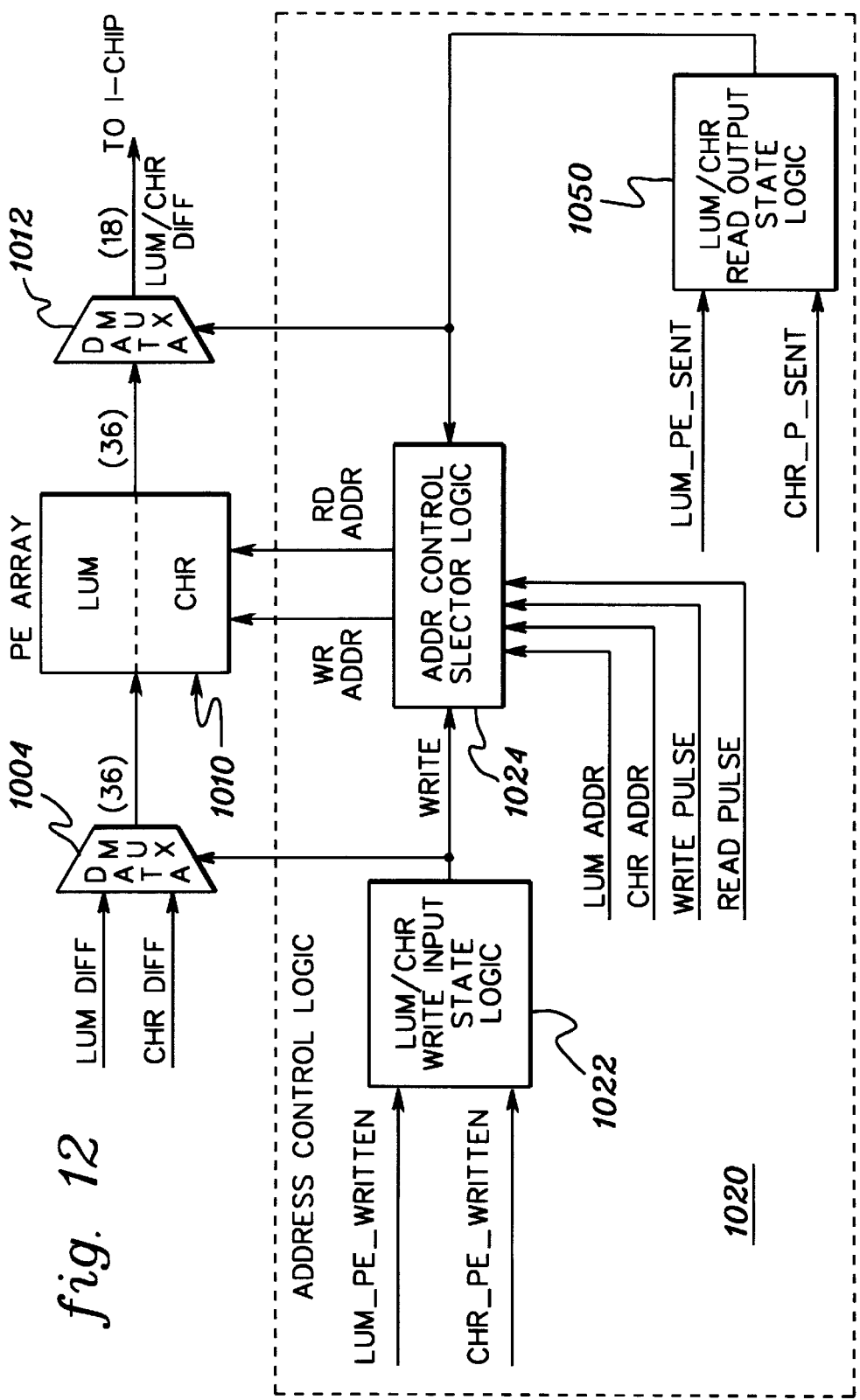
FIG. 12 depicts one embodiment of an address control circuit 1020 in accordance with the present invention for use within the Frame Difference Unit of FIG. 10.

To design the write addressing for the chrominance section of the predicted error array 1010, where there are 64 lines and each line is 36 bits wide, a 7 bit counter is used. To achieve 1 write per line, all but the first bit of the counter address is used:

1_write_addr(0 to 5)=counter(1 to 6)

where bit 0 is not used. This is illustrated in FIG. 12.
For the sequential case, the 1_write_addr is used:

chr_seq_addr(0 to 5)=1-write-addr(0 to 5).

For the every other 4 case, the counter address bits were remapped to produce the chr_eo4_addr:

chr_eo4_addr(0 to 5)=counter(2 to 4,1,5,6,).

To design the read addressing for the chrominance section of the predicted error array, where there are 64 lines where each line is 36 bits each, a 7 bit counter is used. The chrominance has to be read according to a frame or a field indicator, where:

for frame mode:
referring to figure for chrominance:
read u1 and u3 bytes;
read v1 and v3 bytes;
read u2 and u4 bytes;
read v2 and v4 bytes.

To do this, bit 1 of the counter is not used in order to generate the proper sequence of addresses:

frame_read_addr(0 to 5)=counter(0, 2 to 6), where bit 1 is not used.
And likewise for the field mode, for field mode:
referring to figure for chrominance;
read u1 (odd) and u3 (odd) bytes;
read v1 (odd) and v3 (odd) bytes;
read u2 (odd) and u4 (odd) bytes;
read v2 (odd) and v4 (odd) bytes;
read u1 (even) and u3 (even) bytes;
read v1 (even) and v3 (even) bytes;
read u2 (even) and u4 (even) bytes;
read v2 (even) and v4 (even) bytes.

Odd refers to lines 0 to 3, 8 to 11, 16 to 19, etc. Even refers to lines 4 to 7, 12 to 15, 20 to 23, etc. To accomplish this the counter address is remapped to provide the proper sequence of addresses:

field_read_addr(0 to 5)=counter (2 to 4,0,5 to 6)

FIG. 11 depicts one embodiment of a predicted error array in accordance with the invention. In this embodiment, luminance data is stored in an upper portion of the array, and chrominance data is held in a lower portion of the array. As one example, the upper portion of the array could be divided into two columns or words each having 64 addresses for a total of 128 addresses. The chrominance data portion of the array is subdivided into different types of chrominance components u,v and the array is split such that four types of chrominance appear at hex addresses 40–5F and four different types of chrominance appear at hex addresses 60–7F. Addressing for each portion of the array is controlled separately due to the differences in the sequencing and formatting of the luminance and chrominance data. In accordance with this invention, address selection employs a high-order bit superimposed on the luminance address and chrominance address. The high-order bit is controlled by a state-controllable latch in address control logic 1020 shown in FIG. 12.

Referring now to FIG. 12, the following terms are initially defined:

Lum Diff=luminance difference data (18 bits wide) received from calculation logic within other portions of the Frame Difference Unit;

Chr Diff=chrominance difference data (36 bits wide) received from calculation logic within other portions of the Frame Difference Unit;

Lum/Chr Diff=the output of the PE Array, which is either the luminance or chrominance predicted error values;

Lum_PE_Written=state condition caused by writing the last address in the luminance portion of the PE Array, i.e., the high-order bit is held in a given state until address "3F" is written meaning that the luminance portion of the array has been fully written;

Chr_PE Written=state condition caused by writing either address "5F" or "7F" at the chrominance data portion of the PE Array, depending upon the total amount of chrominance data that will be written, i.e., format_420 or format_422;

Lum Addr=the luminance address in accordance with the above-incorporated, commonly assigned patent application entitled "OPTIMAL ARRAY ADDRESSING CONTROL STRUCTURE,"

Chr Addr=the chrominance address developed in accordance with above-incorporated, commonly assigned U.S. patent application entitled "OPTIMAL ARRAY ADDRESSING CONTROL STRUCTURE";

Write Pulse=a write signal received from other logic in Frame Difference Unit, same as general usage write signal;

Read Pulse=a read signal from other logic of Frame Difference Unit, same as a general usage read signal;

Lum_PE_Sent=indicates when the luminance portion of the array has been sent off-chip to the I-chip;

Chr_PE_Sent=indicates when the chrominance portion of the array has been sent off-chip to the I-chip;

Wr Addr=the modified address in accordance with the present invention used to write the PE Array 1010;

Rd Addr=the modified address in accordance with the present invention used to read the PE Array 1010; and High-order bit=the highest order bit or most significant bit used in the Wr Addr or Rd Addr signals sent from the address control logic to the PE Array 1010.

As shown in FIG. 12, within address control logic 1020 in accordance with the present invention, the Lum_PE_Written and Chr_PE_Written signals are input to write input state logic 1022, which outputs a signal that controls whether luminance or chrominance is being written to the PE Array. This signal is forwarded to the input data mux 1004 as well as an address selector logic block 1024. The signal is used to set or reset the High-order bit of the Wr Addr signal. Again, this signal will comprise the Lum Addr or Chr Addr signal concatenated with the High-order bit. Thus, address selector logic 1024 combines and selects the addresses for the PE Array.

As noted, based on the address being written to the PE Array, the ending luminance address is used to identify the state when the luminance predicted error data is all written to the array. This state is then used to set the input control state. The reset to the control is based on a similar condition for chrominance i.e., when the chrominance writes are complete to the array. The input control state is used to gate the high-order bit through the address selector logic 1024 to produce the full address (Wr Addr) to the PE Array. By this structure, the array addressing is controlled by a single source for input writes and is assured of completing each sectional write (i.e., full luminance or full chrominance) before switching of the high-order bit.

Preferably, the PE Array comprises a dual-port GRAM, so that the Frame Difference Unit can be writing luminance or chrominance difference data into the array while at the same time the I-chip can be reading chrominance or luminance data from the array. As one example, the PE array could comprise a 128 x 36 bit two-port GRAM. In order to control the possible contention between trying to write the same data that is being read, two control states are implemented within the Frame Difference Unit in accordance with the present invention to lock access to the data as it is being written. Signal Lum__PE__Written is used to indicate that all luminance predicted error data has been written to the array, while the corresponding chrominance state is controlled by the address in conjunction with the chroma format, since the amount of chrominance data for 4:2:0 is half that for 4:2:2. As noted above, these controls are used as inputs to toggle the write input state logic output signal to input data mux 1004 to write data to the PE Array.

The luminance and chrominance predicted error data as accepted by the Frame Difference Unit must be controlled, received and sent in the same order. That is, the order of: luminance, chrominance, luminance, etc. Since the sources of the luminance and chrominance data are independent in the R- and I-chips of the encoder, the luminance portion and chrominance portion of the macroblock could arrive out of sequence. Thus, the Frame Difference Unit must maintain the order so that data is not overwritten in the array before it gets sent to the I-chip, and because maintaining the order is essential for the I-chip since it depends on getting luminance and chrominance pairs for each macroblock. As shown in FIG. 12, addressing controls are implemented such that as each area of the array is written and sent, the states control the input sequencing and output sequencing. Thus, only once the luminance area is written can the control signals toggle to writing of the chrominance. On the output side, the Lum__PE__Sent and Chr__PE__Sent signals toggle after the luminance or chrominance is respectively sent to the I-chip.

Figures 13A, 13B:
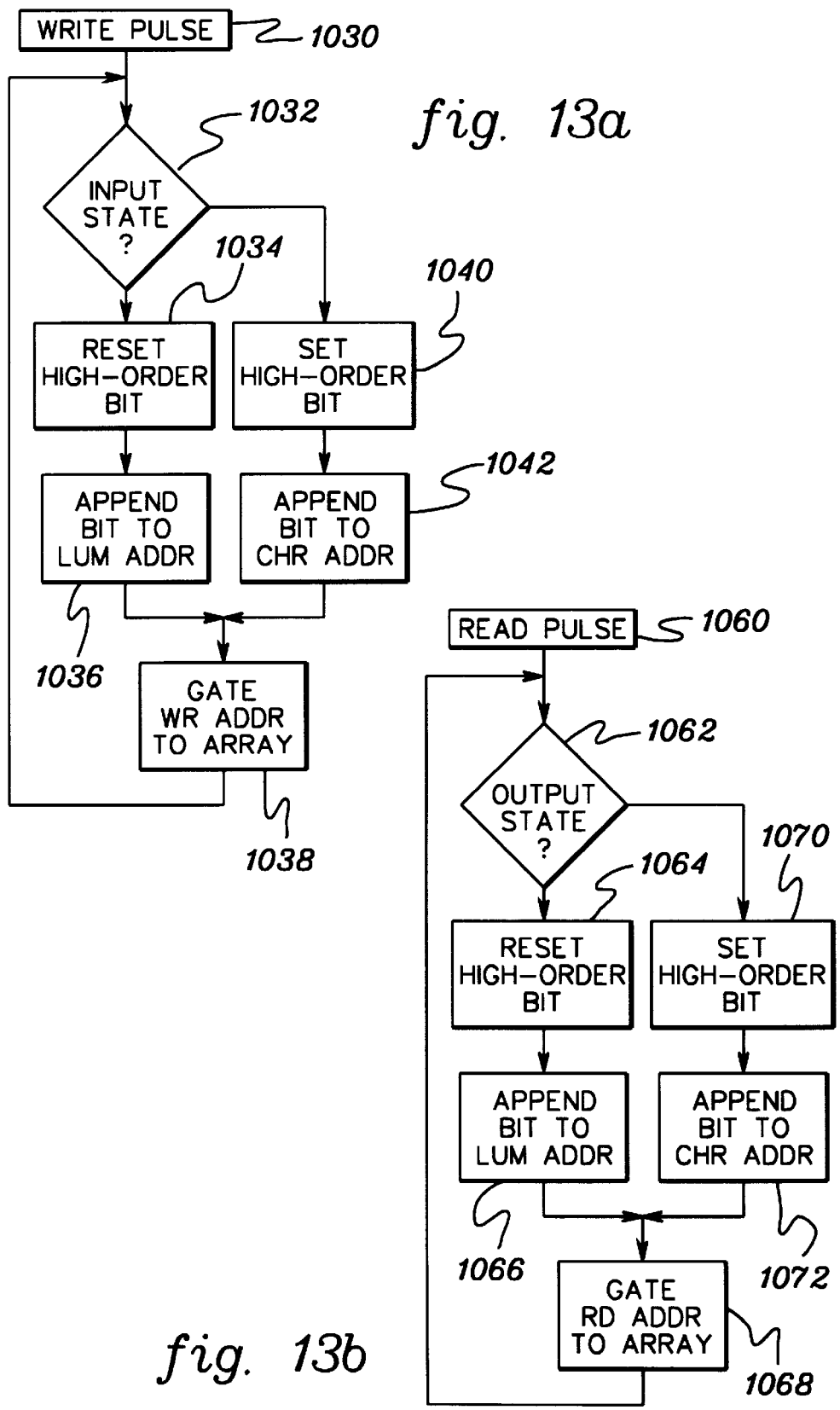
FIGS. 13a & 13b show write and read flowcharts, respectively, for processing implemented by the address control selector logic 1020 of FIG. 12.

FIG. 13*a* depicts one embodiment of logic processing implemented by address selector logic 1024 of FIG. 12. In this flowchart, receipt of a Write Pulse 1030 initiates processing wherein the state of the Lum/Chr Write Input State Logic is initially determined 1032. If the input state is such that luminance is being written, then the high-order bit remains in a reset state (i.e., "0" value) 1034 and this high-order bit is appended 1036 to the Lum Addr received at the address selector logic. The result is the modified write address, or Wr Addr, which is gated to the PE Array 1038. Similarly, if chrominance data is being written, then the high-order bit remains set (i.e., value "1") 1040 and is appended to the chromium address (Chr Addr) 1042 before being output from the address selector logic to the PE Array as Wr Addr.

As shown in FIG. 12, the read portion of the address control logic 1020 is analogous to the write portion. Mainly, a Lum/Chr read output state logic block 1050 controls whether luminance or chrominance is being read from the PE Array via the Lum PES Sent and Chr__PE__Sent signals generated by the address control logic. The output of state logic 1050 controls a high-order bit on the read address (Rd Addr) essentially as described above in connection with the write address.

FIG. 13*b* depicts one embodiment of the flow processing with a read array signal. Upon receipt of a read pulse 1060, the output state of logic 1050 (FIG. 12) is examined to determine whether a luminance or chrominance read is to occur. If a luminance read is signalled, then the high-order bit is held in a reset state (i.e., "0") 1064 and is appended to the receive Lum Addr address by the address selector logic. The concatenated address is then gated to the PE Array as the Rd Addr signal 1068. Similarly, if chrominance data is to be read, then from inquiry 1062 the high-order bit is set (i.e., "1") 1070 to designate reading of chrominance data, and is appended to the chrominance address (Chr Addr) 1072. This modified signal then comprises the Rd Addr signal gated to the PE Array 1068.

To achieve optimum performance through the PE Array structure to the I-chip, it is desirable to allow reading of luminance data before all luminance data has been written into the array. Chrominance data is less problematic since the data is typically completely written into the array before being required for forwarding to the I-chip. Thus, special consideration in given herein to control of the PE Array to allow simultaneous luminance writing and luminance reading at different array addresses.

The Frame Difference Unit is also required to share a data bus with the I-chip such that the Frame Difference Unit sends either luminance or chrominance data to the I-chip across this shared bus. Thus, the Frame Difference Unit has to monitor the bus for data valid indications and count the data as the I-chip processes it before the Frame Difference Unit can proceed to send more data to the I-chip.

Figure 14:
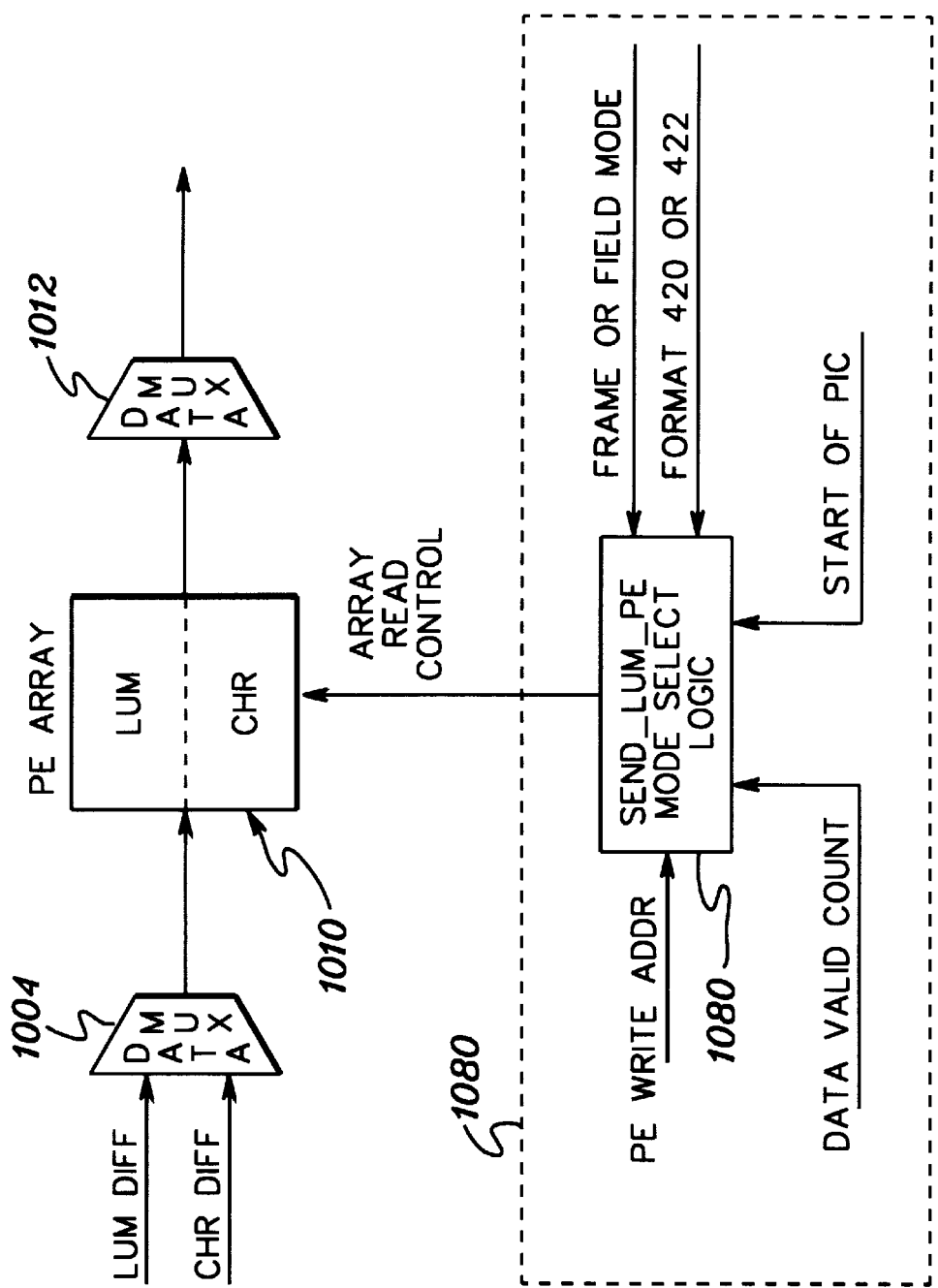
FIG. 14 depicts one embodiment of the array read control logic 1080 in accordance with the present invention.

The amount of data written to the array has been identified to ensure that the amount of data absolutely required to be written into the array is complete before reading begins. Six modes were identified depending upon how much data (chroma format 4:2:0 or 4:2:2) in total would be written, the structure of the data to be written (frame format (every line of the array) or field format (every 4 lines of the array)), the count of the appropriate number of data valids across the share bus (indicating that the I-chip had received and processed the previously sent macroblock of either luminance or chrominance to the next chiplet on the R-chip), and finally whether it was the start of a picture or not (if so, then the Frame Difference Unit would not have to count the data valids on the shared bus). Table I below sets forth the modes identified. A control state is defined as shown in FIG. 14 wherein each unique mode would set the state, called Send-Lum-PE as the data was being written to the array. This state is then used as the read control for the luminance portion of the PE Array (the array read control).

TABLE 1

|  | Lum Send Modes | | | | | |
| --- | --- | --- | --- | --- | --- | --- |
| Inputs | 1 | 2 | 3 | 4 | 5 | 6 |
| Start of Pic | yes | yes | no | no | no | no |
| PE_Wr_Addr | 32 | 36 | 32 | 36 | 32 | 36 |
| Frame_Field_Mode | Fr | Fi | Fr | Fi | Fr | Fi |
| Format_420_422 | x | x | 420 | 420 | 422 | 422 |
| Data_Valid_Count | x | x | 128 | 128 | 256 | 256 | wherein:
  start of pic=denotes start of picture at time 0;
  PE_Wr_Addr=the address used to write the PE Array (which is the same as the Wr Addr of FIG. 12);
  Frame_Field_Mode=identifies whether frame mode or field mode is used for writing of data into the PE Array;
  Format_420_422=whether chrominance data is written in format 4:2:0 or 4:2:2; and
  Data_Valid_Count=the count value needed to be reached by the logic as it counts the data valids across the shared bus before data can be read from the PE Array.

Figure 15:
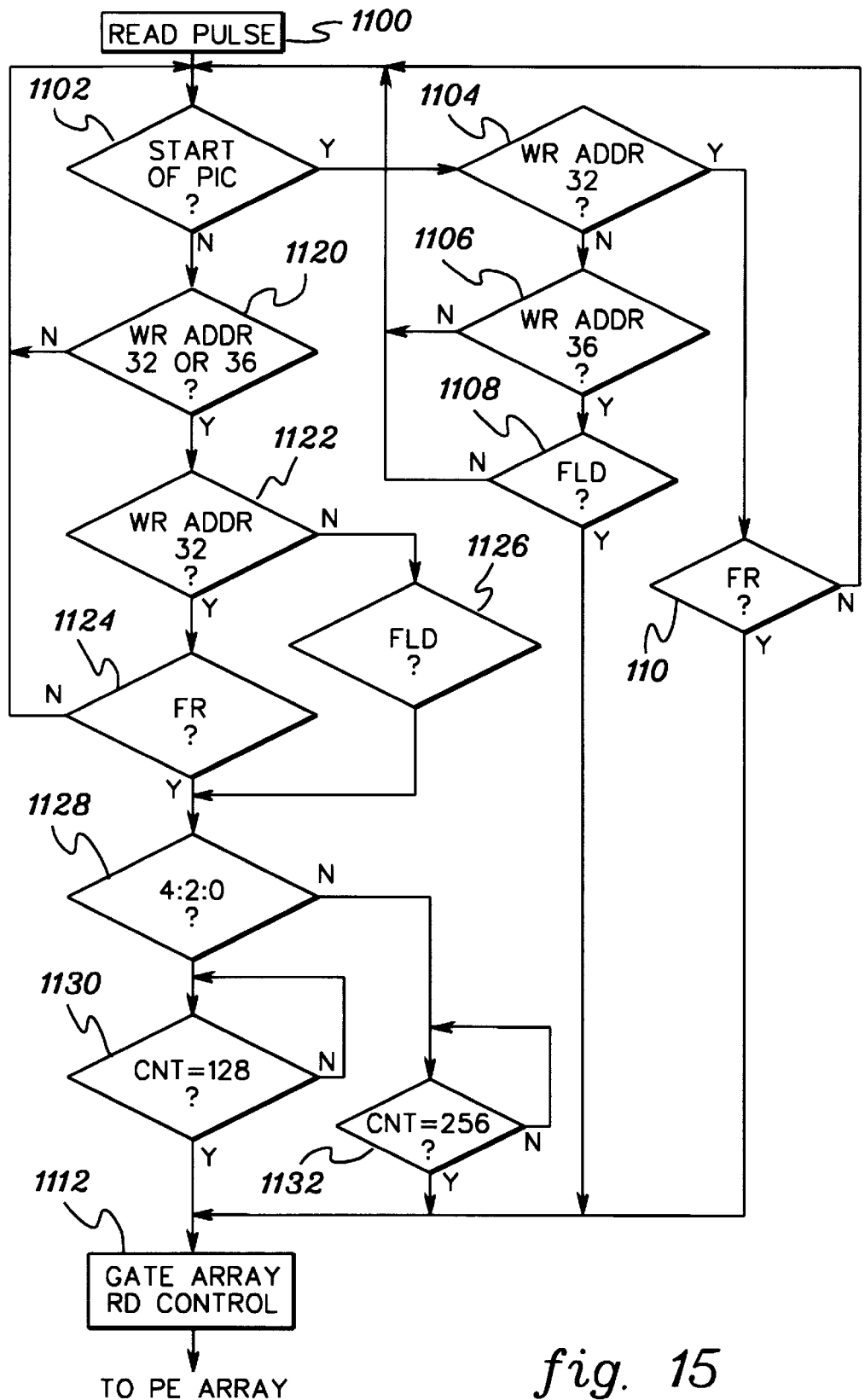
FIG. 15 is a flowchart of one processing embodiment for the array read control logic of FIG. 14.

As shown in FIG. 14, the five signal inputs of Table I comprise inputs to the Send_Lum_PE mode select logic 1082 of the array read control 1080 to the PE Array 1010. The Send_Lum_PE flowchart of FIG. 15 graphically depicts the Table I information. Upon receipt of a read pulse 1100 processing inquires whether this is start of a picture 1102. If "yes", then the shared bus need not be monitored and processing determines determines whether the predicted error Wr Addr is equal to 32 1104. If yes again, inquiry is made whether the data was written in frame mode 1110. If "no", processing returns to inquiry 1102. If the write address is equal to 32 and data was written in the frame mode, then the array read control is gated to the predicted error array 1112.

From inquiry 1104, if the write address is other than 32, inquiry is made whether the Wr Addr is equal to 36 1106. If "no", return is made to inquiry 1102. However, if the address is 36, then processing determines whether data was written into the PE Array in field mode 1108. If "no", return is made to inquiry 1102. Otherwise, the array read control signal is gated to the PE Array.

If, subsequent to receipt of the read pulse, processing begins at other than start of picture then inquiry is made whether the Wr Addr address is equal to 32 or 36 1130. If neither, then return is made to inquiry 1102. Assuming that the write address is at either 32 or 36 in the PE Array, then inquiry is made as to which of the two possibilities is present 1122. If the write address is equal to 32, then processing determines whether data was written into the array in frame mode 1124. If no, processing returns to inquiry 1102. Similarly, if the write address is equal to 36, then processing determines whether data was written into the array in field mode 1126. Again, frame mode means that data is written into every line of the array, while field mode dictates writing of data every other 4 lines of the array. The choice of addresses 32 and 36 for frame and field modes, respectively, has been made to ensure that writing is far enough along into the PE Array that reading of data from the array will be unable to overlap data being written into the array. Note that reading of data occurs at a different rate than writing of data into the array and therefore a buffer is needed in order to ensure the separation of the two processes. Although the choice of 32 and 36 are believed optimum, the invention presented herein would work with other selections as well.

Assuming that the write address is equal to 32 and data was written in frame mode, or that the write address is equal to 36 and data was written in field mode, then processing inquires how the chrominance data was written into the array 1128. If written in 4:2:0 mode, the data valid count is examined for equality to 128 1130, and if no, processing waits until the data valid count is equal to 128. Similarly, if data was written in 4:2:2 mode, then inquiry is made whether the data valid count is equal to 256 1132 and if no, processing waits until the data valid count is equal to 256. Once the count has reached the designated level, then the array read control is gated 1112 to the PE Array.

Those skilled in the art will note from the above discussion that four distinct areas of the Frame Difference Unit are addressed herein. Mainly, a dual-use predicted error array containing both luminance and chrominance data is presented. In addition, the array is designed to comprise a dual-port structure to allow for I-chip reads of the array while the Frame Difference Unit is writing the array. Further, sequencing of luminance and chrominance data written and read into and out of the array is maintained and a sufficient amount of data is written to the array before beginning reading of data from the array to allow reading of data to continue without causing the overrunning of data.

Entropy Processing in Intra-chip
Intra-processor

The Intra-processor 601 is shown in detail in FIG. 6. When the current macroblock data is made available from frame memory, the energy content of the macroblock, which is used to determine a quantization level for the best rate control, is calculated by the I-processor 601. A frame or field DCT decision is made by the I-processor 601 on the frame difference data when it is returned from the R-chip 801. The Intra-processor 601 has a dynamically partitionable feature that allows it to operate as four 1 byte units or as one 4 byte entity. Both the quantization and field/frame DCT calculations are performed in partitioned mode which provides a four fold performance gain.

Depending on the input picture and the specified output bitrate, overflow or underflow conditions may occur. It is the rate control's responsibility to avoid either of these conditions. Use of DC only and external FIFO feedback are installed to avoid the overflow case. Padding is put in place to control or even eliminate the underflow case.

Picture coding time depends on the input format and coding format. Picture rate is specified by the application. Picture gap is the time the encoder is not busy in picture coding. Picture gap is determined by picture rate and picture coding time. Padding, if needed, is performed in picture gap. This limits the maximum bits the encoder can pad per gap. The encoder keeps track of the number of bits generated per picture and bits allocated per picture. If the bits generated is less than bits allocated, padding will be used to fill the unused bits. The unused bits from a picture may be padded across several picture gaps. This mechanism ensures the bitstream complies with the application without performance violation.

Quantizer

A coefficient clipping feature is present in the quantizer unit. The coefficient clipping register, written by microcode, is used to contain the position of the last non-zero amplitude coefficient in a block. When the rate control detects a near overflow condition, the code can write a value into the coefficient clipping register. This value is calculated based on overflow closeness. All coefficients after the location specified in the coefficient clipping register are made zero. This scheme is also used to produce a constrained bitstream.

A constrained bitstream is defined in the MPEG2 Main Profile at Main Level standard as all macroblocks in a slice, except two macroblocks, must contain less than 4608 bits each. The encoder keeps track of the bits generated per macroblock and the number of macroblocks in a slice that have over 4608 bits. When two macroblocks having over 4600 bits are encountered, the coefficient clipping register is set to 31 for the remaining of the slice. In this case, the chip will use the first 31 coefficients to form the bitstream. The number of bits used per coefficient depends on the coefficient value. Twenty-four bits are used to code a maximum value. Assuming all 31 coefficients contain the maximum number, 4464 bits will be produced per macroblock in 4:2:0 format. This mechanism ensures that the output bitstream is constrained and also curbs the bits generated to avoid overflows.

Variable Length Encoder

The output of quantization, prior to ZZ scan processing, is returned to R-chip 801 for reconstruction of the picture. This eliminates some design complexity and an inverse ZZ function is not required on the R-chip 801. The scan format is selectable at the host interface. Microcode can also select the scan format based on picture format. Alternate scan is used for interlaced coding and traditional scan for progressive pictures.

ZZ scan is applied to the quantized data, which is variable length coded with the Huffman table. The variable length data is saved in a buffer. Coded block pattern, as defined in the MPEG2 standard, is used to indicate which block contains non zero data in the macroblock. When all blocks are coded, headers are attached to the VLC data.

Compressed store interface

Headers are generated in a flexible manner. The header definitions are stored in a programmable table. The microcode also has the capability to modify the content of the header table when changes occur in the standard. Depending on the application needs, the microcode selects which header to generate. The elementary stream is found from the coefficient data along with the headers.

Integrated System

In one embodiment there is provided according to our invention an MPEG2 compliant digital video encoder system having an I-frame video encoder module 601 with (1) a host interface 611, (2) a pixel interface 641 for receiving pixel data from a pixel bus 643, (3) a frame memory interface 651 for receiving and sending frame data, (4) a Discrete Cosine Transform processor 671, (5) a quantization unit 673, (6) a variable length encoder 675, (7) a FIFO buffer 677, and (8) a compressed store interface 679, for generating an I-frame containing bitstream.

In a further exemplification the scalable architecture MPEG2 compliant digital video encoder system the I-frame video encoder module includes (9) an interface to motion estimation means, and the system further includes a second processor, i.e., an R-processor element 901 with (10) a reference memory interface 911, (11) motion estimation means 903, (12) inverse quantization means 941, (13) inverse discrete cosine transform means 943, and motion compensation means 945. The system also includes at least one third processor element or Search processor element 801 with (14) a search memory interface and (15) motion estimation means 801. This embodiment provides an I-P-B datastream.

The encoder can be in the form of a single chip or a plurality of chips. For example, there may be separate integrated circuit chips for the I-frame video encoder module, the second processor element 901, and the third processor element 801. There may also be more then one such third processor element 801.

According to an alternative embodiment of the invention there is provided a digital video encoder system where the I-frame video encoder module 601 includes (9) an interface to motion estimation means, and the system further includes only a second or R-processor element with (10) a reference memory interface 911, (11) motion estimation means 903, (12) inverse quantization means 941, (13) inverse discrete cosine transform means 943, and motion compensation means 945. This embodiment is useful for generating an I-P datastream.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A digital video encoder system comprising:
   a refinement processor for reconstructive processing for I-picture and P-picture encoding, said refinement processor including a frame difference unit;
   wherein said frame difference unit comprises a predicted error array (PE array), said PE array comprising a shared-use storage structure for holding a macroblock of data, storing both luminance component data and chrominance component data of the macroblock, within a dual-port array for controlling simultaneous reading and writing of the macroblock data from and to the PE array; and
   sequence control logic for said PE array to provide synchronous writing and reading of both luminance component data and chrominance component data of the macroblock to and from said PE array, wherein said sequence control logic preserves sequencing of transfers of luminance and chrominance component data both into and out of the PE array, and wherein a data transfer sequence of macroblock data written to the PE array is identical to a required data transfer sequence of macroblock data to be read from the PE array, said sequence control logic comprising a single point of control for controlling the simultaneous reading and writing of both luminance component data and chrominance component data of the macroblock into and out of the dual-port, shared-use PE array.

2. The digital video encoder system of claim 1, wherein said PE array is divided into a first portion for storing luminance component data of said macroblock and a second portion for storing chrominance component data of said macroblock, and wherein said sequence control logic comprises state sequencing logic for signaling when the first portion of the PE array is fully written with luminance component data and for signaling when the second portion of the PE array is fully written with chrominance component data.

3. The digital video encoder system of claim 1, wherein said digital video encoder system comprises an MPEG-2 compliant digital video encoder system.

4. The digital video encoder system of claim 1, further comprising array read control logic for controlling reading of data from the PE array simultaneously with writing of luminance component data or chrominance component data of the macroblock to the PE array without overrunning an amount of data stored by said writing of luminance component data or chrominance component data.

5. The digital video encoder system of claim 4, wherein said array read control logic comprises logic for determining whether a received address for the writing of data into the PE array comprises a predetermined address in the PE array, said predetermined address comprising an address sufficient for a given mode of writing of data to the PE array to ensure that reading of data from the PE array simultaneous with further writing of data to the PE array will not overrun said writing of data.

6. The digital video encoder system of claim 5, wherein said sequence control logic comprises address selector logic and wherein said array read control logic comprises logic for gating an array read control signal to the PE array, and wherein both said array read control signal and a read address from said address selector logic are needed to read data from the PE array.

7. The digital video encoder system of claim 6, wherein said digital video encoder system comprises an MPEG-2 compliant digital video encoder system and an output of said frame difference unit is coupled to an I-processor via a shared bus, and wherein said array read control logic further comprises counter logic for signaling when data can validly be output from the PE array of the frame difference unit to the I-processor via the shared bus.

8. The digital video encoder system of claim 4, wherein said array read control logic comprises logic for controlling reading of luminance component data from the PE array simultaneous with writing of luminance component data to the PE array, wherein said reading of luminance component data from the PE array commences before all corresponding luminance component data has been written into the PE array.

9. A digital video encoder system comprising:
a refinement processor for reconstructive processing for I-picture and P-picture encoding, said refinement processor including a frame difference unit;
wherein said frame difference unit comprises a predicted error array (PE array), said PE array comprising a shared-use array storing both luminance data and chrominance data;
address selector logic for addressing said PE array to provide synchronous writing and reading of both luminance data and chrominance data to and from said PE array to preserve sequencing of data both into and out of the PE array wherein an order of data written to the PE array is identical to an order of data to be read from the PE array;
wherein said PE array stores a macroblock of data and is divided into a first portion for storing luminance data of said macroblock and a second portion for storing chrominance data of said macroblock, and wherein said address selector logic comprises state logic for signaling when the first portion of the PE array is fully written with luminance data and for signaling when the second portion of the PE array is fully written with chrominance data; and
wherein said signal from said state logic is coupled to either set or reset a lum/chr bit, and wherein said address selector logic further comprises means for concatenating said lum/chr bit to a received luminance address and a received chrominance address, said lum/chr bit signaling whether luminance data is to be written to said first portion of the PE array or chrominance data is to be written to said second portion of the PE array, said address selector logic comprising control logic for writing all luminance data of the macroblock to the first portion of the PE array before writing chrominance data of the macroblock to the second portion of the PE array.

10. A digital video encoder system comprising:
a refinement processor for reconstructive processing for I-picture and P-picture encoding, said refinement processor including a frame difference unit;
wherein said frame difference unit comprises a dual-port predicted error array (PE array), said PE array comprising a shared-use storage structure for holding a macroblock of data, and storing both luminance component data and chrominance component data of the macroblock; and
array read control logic for controlling reading of macroblock data from the PE array simultaneous with writing of macroblock data to the PE array without overrunning said writing of macroblock data to the PE array said array read control logic comprising a single point of control for controlling the simultaneous reading and writing of both luminance component data and chrominance component data of the macroblock into an out of the dual-port, shared-use PE array.

11. The digital video encoder system of claim 10, wherein said array read control logic comprises array read control logic for controlling reading of luminance component data from the PE array simultaneous with writing of luminance component data or chrominance component data to the PE array without overrunning an amount of data stored by said writing of luminance component data or chrominance component data to the PE array.

12. The digital video encoder system of claim 10, wherein said array read control logic comprises logic for determining whether a received address for the writing of data into the PE array comprises a predetermined address in the PE array, said predetermined address comprising an address which ensures for a given mode of writing of data into the PE array that reading of macroblock data from the PE array simultaneous with further writing of macroblock data into the PE array is unable to overrun the writing of macroblock data into the PE array.

13. The digital video encoder system of claim 10, wherein said array read control logic comprises logic for gating an array read control signal to the PE array, wherein both said array read control signal and a read address are employed to read data from the PE array.

14. The digital video encoder system of claim 3, wherein said digital video encoder system comprises an MPEG-2 compliant digital video encoder system and an output of said frame difference unit is coupled to an I-processor via a shared bus, and wherein said array read control logic further comprises counter logic for signaling when data can validly be output from the PE array of the frame difference unit to the I-processor via the shared bus.

15. The digital video encoder system of claim 10, wherein said PE array is divided into a first portion for storing luminance component data of said macroblock of data and a second portion for storing chrominance component data of said macroblock of data, and wherein said array read control logic comprises array read control logic for controlling reading of data from said first portion of said PE array simultaneous with writing of data to said first portion of said PE array.

16. A method for controlling storing of a macroblock of data in a predicted error array (PE array) of a frame difference unit within a refinement processor of a digital video encoder system, said macroblock of data including luminance component data and chrominance component data, said method comprising:
writing said luminance component data and chrominance component data of the macroblock of data into the PE array, said PE array comprising a shared-use storage structure for holding said macroblock of data;

reading macroblock data from the PE array simultaneous with writing of macroblock data to the PE array without overrunning said writing of macroblock data into the PE array; and maintaining data transfer sequencing of said writing and reading of luminance component data and chrominance component data to and from the PE array so that a data transfer sequence of macroblock component data written to the PE array is identical to a required data transfer sequence of macroblock component data to be read from the PE array, wherein said maintaining comprises a single point of control for controlling the simultaneous reading and writing of both luminance component data and chrominance component data of the macroblock into an out of the shared-use PE array.

17. The method of claim 16, wherein said PE array comprises a first portion and a second portion, and wherein said writing of luminance component data and chrominance component data comprises writing said luminance component data into said first portion of said PE array and writing said chrominance component data into said second portion of said PE array, and wherein said reading comprises reading luminance component data from the first portion of the PE array simultaneous with writing of luminance component data to the first portion of the PE array.

18. The method of claim 17, wherein said maintaining comprises determining when said first portion of said array is fully written before beginning writing of said second portion of said array, and determining when said second portion of said array is fully written before beginning writing of a next macroblock of data into said first portion of said PE array.

19. The method of claim 16, wherein said reading comprises delaying reading of macroblock data from the PE array until writing of said luminance component data into the FE array has reached a predetermined address in the PE array for a given mode of writing, said predetermined address being sufficient to ensure that reading of data from the PE array simultaneous with further writing of data to the PE array will not overrun an amount of data stored by said writing of data to the PE array.

20. The method of claim 16, wherein the digital video encoder system comprises an MPEG-2 compliant digital video encoder system and an output of the frame difference unit is coupled to an I-processor via a shared bus, and wherein said method further comprises outputting read data from the PE array only when data can validly be placed on the shared bus coupling the frame difference unit to the I-processor.

21. A digital video encoder system comprising:

a refinement processor for reconstructive processing for I-picture and P-picture encoding, said refinement processor including a frame difference unit;

wherein said frame difference unit comprises a dual-port predicted error array (PE array), said PE array comprising a shared-use array for holding a macroblock of data and storing both luminance component data and chrominance component data of the macroblock;

array read control logic for controlling reading of data from the PE array simultaneous with writing of data to the PE array without overrunning said writing of data to the PE array; and wherein said array read control logic comprises logic for controlling reading of luminance component data from the PE array simultaneous with writing of luminance component data to the PE array, wherein said reading of luminance component data from the PE array commences before all corresponding luminance component data has been written into the PE array.

* * * * *

UNITED STATES PATENT AND TRADEMARK OFFICE
CERTIFICATE OF CORRECTION

| | |
|---|---|
| PATENT NO. | : 6,118,823 |
| DATED | : September 12, 2000 |
| INVENTOR(S) | : Jeffery Dean Carr |

It is certified that error appears in the above-identified patent and that said Letters Patent is hereby corrected as shown below:

Column 26,
Line 43, delete "claim 3" and insert -- claim 13 --

Signed and Sealed this

Eighteenth Day of September, 2001

Attest:

NICHOLAS P. GODICI
*Attesting Officer*   *Acting Director of the United States Patent and Trademark Office*